United States Patent
Suefuji

(10) Patent No.: US 10,917,024 B2
(45) Date of Patent: Feb. 9, 2021

(54) VIBRATION-TYPE DRIVE APPARATUS, ROBOT, IMAGE FORMING APPARATUS, AND IMAGE PICKUP APPARATUS THAT INHIBIT UNDESIRED VIBRATION

(71) Applicant: CANON KABUSHIKI KAISHA, Tokyo (JP)

(72) Inventor: Kei Suefuji, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 970 days.

(21) Appl. No.: 15/504,824

(22) PCT Filed: Oct. 30, 2015

(86) PCT No.: PCT/JP2015/081419
§ 371 (c)(1),
(2) Date: Feb. 17, 2017

(87) PCT Pub. No.: WO2016/072524
PCT Pub. Date: May 12, 2016

(65) Prior Publication Data
US 2017/0229980 A1  Aug. 10, 2017

(30) Foreign Application Priority Data

Nov. 7, 2014  (JP) .................................. 2014-226924
Aug. 28, 2015  (JP) .................................. 2015-169182

(51) Int. Cl.
*B25J 9/12*  (2006.01)
*H02N 2/10*  (2006.01)
(Continued)

(52) U.S. Cl.
CPC .............. *H02N 2/103* (2013.01); *B25J 9/12* (2013.01); *B25J 9/126* (2013.01); *H02N 2/006* (2013.01); *H02N 2/163* (2013.01)

(58) Field of Classification Search
CPC ............ H02N 2/103; H02N 2/006; B25J 9/12
(Continued)

(56) References Cited

U.S. PATENT DOCUMENTS 5,164,629 A * 11/1992 Nakanishi .............. H02N 2/163
310/323.03
6,463,642 B1  10/2002 Maruyama et al.
(Continued)

FOREIGN PATENT DOCUMENTS

JP  64-89978 A  4/1989
JP  06-0261564 A  9/1994
(Continued)

OTHER PUBLICATIONS

International Search Report and Written Opinion of International Application No. PCT/JP2015/081419.
(Continued)

*Primary Examiner* — Thomas M Dougherty
*Assistant Examiner* — Karen B Addison
(74) *Attorney, Agent, or Firm* — Venable LLP

(57) ABSTRACT

A vibration-type drive apparatus, which increases productivity and also prevents undesired vibration from occurring during operation, includes an elastic body, a vibrating body having an electro-mechanical energy conversion element mounted on the elastic body, a driven body that is brought into pressure contact with the vibrating body, and a pressurizing member that brings the driven body into pressure contact with the vibrating body. Relative positions of the vibrating body and the driven body change due to vibrations excited in the vibrating body. The pressurizing member has a positioning portion, and the driven body has a fitting-receiving portion that is to be fitted onto the positioning portion. During operation, the positioning portion and the fitting-receiving portion are not in contact with each other.

22 Claims, 17 Drawing Sheets

(51) Int. Cl.
*H02N 2/00* (2006.01)
*H02N 2/16* (2006.01)

(58) Field of Classification Search
USPC ............ 310/323.08, 323.02, 323.03, 323.16, 310/323.06
See application file for complete search history.

(56) References Cited

U.S. PATENT DOCUMENTS

| | | | |
|---|---|---|---|
| 8,970,091 B2* | 3/2015 | Suefuji | H02N 2/163 |
| | | | 310/323.03 |
| 10,075,101 B2* | 9/2018 | Suefuji | H02N 2/12 |
| 2001/0000940 A1 | 5/2001 | Maruyama et al. | |
| 2011/0273058 A1* | 11/2011 | Suefuji | H02N 2/0065 |
| | | | 310/323.02 |

FOREIGN PATENT DOCUMENTS

| | | |
|---|---|---|
| JP | 11-113271 A | 4/1999 |
| JP | 2003-199369 A | 7/2003 |
| JP | 2009-201319 A | 9/2009 |
| JP | 2012-125070 A | 6/2012 |
| JP | 2013-258866 A | 12/2013 |

OTHER PUBLICATIONS

U.S. Appl. No. 15/333,613, Kei Suefuji, filed Oct. 25, 2016.
Office Action dated Jun. 25, 2019, in Japanese Patent Application No. 2015-169182.

* cited by examiner

VIBRATION-TYPE DRIVE APPARATUS, ROBOT, IMAGE FORMING APPARATUS, AND IMAGE PICKUP APPARATUS THAT INHIBIT UNDESIRED VIBRATION

TECHNICAL FIELD

The present invention relates to a vibration-type drive apparatus (vibration-type actuator) which brings a vibrating body and a driven body into pressure contact with each other and moves the vibrating body and the driven body relatively to each other through vibrations excited in the vibrating body, and a robot, an image forming apparatus, and an image pickup apparatus that have the vibration-type drive apparatus.

BACKGROUND ART

There are known vibration-type drive apparatuses which bring a driven body into pressure contact with a vibrating body, which is constructed by joining an electro-mechanical energy conversion element to an elastic body, and move the vibrating body and the driven body relatively to each other by applying an AC signal to the electro-mechanical energy conversion element and exciting predetermined vibrations in the vibrating body. An example of such vibration-type drive apparatuses changes relative positions of the vibrating body and the driven body, which are coaxially placed, by rotating them (see PTL (Patent Literature) 1).

FIG. 17 is a cross-sectional view schematically showing an arrangement of a vibration-type drive apparatus 900 according to a prior art. It should be noted that the vibration-type drive apparatus 900 is equivalent to the one described in the PTL 1. In the vibration-type drive apparatus 900, an output shaft 908 is attached to a housing 901 via bearings 909a and 909b, and an annular vibrating body 902 is fixed with the output shaft 908 at its center. The vibrating body 902 has an elastic body 902b on an upper surface of which a plurality of projecting portions 902d are formed, and a piezoelectric element 902b bonded to a bottom (a surface opposite to the surface on which the projecting portions 902d are formed) of the elastic body 902b using an adhesive agent.

The projecting portions 902d are formed on the upper part of the elastic body 902b over the whole circumference. The elastic body 902b is made of stainless steel, and the projecting portions 902d are subjected to hardening treatment such as nitriding treatment so as to improve durability. Applying a predetermined AC voltage having a phase difference to the piezoelectric element 902b from a drive circuit, not shown, generates progressive vibration waves in the projecting portions 902d, which in turn frictionally drive a driven body 903 to thus rotate the driven body 903.

The driven body 903 has an annular shape and is made, for example, of quenched stainless steel. A spring receiving member 906 and a pressurizing member 907 are placed on an upper surface of the driven body 903, and the driven body 903 is pressurized against the vibrating body 902 with a predetermined pressure. On the other hand, there has been proposed a vibration-type drive apparatus which brings an outer peripheral portion of a pressurizing spring, which is a pressurizing member, into abutment with a part of a driven body to inhibit displacement of the driven body in a radial direction and improve the ease of assembly (see PTL 2).

CITATION LIST

Patent Literature

{PTL 1} Japanese Laid-Open Patent Publication (Kokai) No. 2012-125070
{PTL 2} Japanese Laid-Open Patent Publication (Kokai) No. 2003-199369

SUMMARY OF INVENTION

Technical Problem

However, the vibration-type drive apparatus 900 described in the PTL 1 above may be assembled with a central axis of the driven body 903 and a central axis of the vibrating body 902 being misaligned in a radial direction. When the central axis of the driven body 903 and the central axis of the vibrating body 902 are misaligned, the driven body 903 is driven eccentrically with respect to the vibrating body 902, resulting in unstable rotational speed and torque and generation of abnormal noise.

To address this problem, there may be a countermeasure using an assembly method that keeps misalignment of the central axis of the driven body 903 and the central axis of the vibrating body 902 in the radial direction within an acceptable range of concentricity by assembling the vibration-type drive apparatus 900 using the assembly jig with high accuracy. Using assembly jigs, however, has problems of productivity decreased due to replacement of the assembly jigs, and limitations on the shape of the vibration-type drive apparatus 900 because of the need to secure space for the assembly jigs.

On the other hand, according to the technique described in the PTL 2 above, eccentricity of the driven body is allowed to be inhibited without using assembly jigs, but during operation, the pressurizing spring is always in contact with a part of the driven body. Therefore, vibrations occurring in the driven body are transmitted to the pressurizing spring, causing undesired vibration of the vibration-type drive apparatus to occur. Moreover, vibrations are transmitted to the output shaft and the driven body, which is being driven by the vibration-type drive apparatus, via the pressurizing spring, and this may make operation of the driven body unstable.

The present invention provides a vibration-type drive apparatus, a robot, an image forming apparatus, and an image pickup apparatus which increase productivity and also prevent undesired vibration from occurring during operation.

Solution to Problem

Accordingly, the present invention provides a vibration-type drive apparatus comprising an elastic body, a vibrating body configured to have an electro-mechanical energy conversion element mounted on the elastic body, a driven body configured to be brought into pressure contact with the vibrating body, and a pressurizing member configured to bring the driven body into pressure contact with the vibrating body, wherein relative positions of the vibrating body and the driven body change due to vibrations excited in the vibrating body, and wherein the pressurizing member comprises a positioning portion, the driven body comprises a fitting-receiving portion configured to be able to fit to the positioning portion, and during operation, the positioning portion and the fitting-receiving portion are not in contact with each other.

Advantageous Effects of Invention

According to the present invention, productivity of the vibration-type drive apparatus is increased, and undesired vibration is prevented from occurring as the vibration-type drive apparatus is running.

The features and advantages of the invention will become more apparent from the following detailed description taken in conjunction with the accompanying drawings.

DESCRIPTION OF EMBODIMENTS

The present invention will now be described in detail with reference to the drawings showing preferred embodiments thereof.

Figure 1:
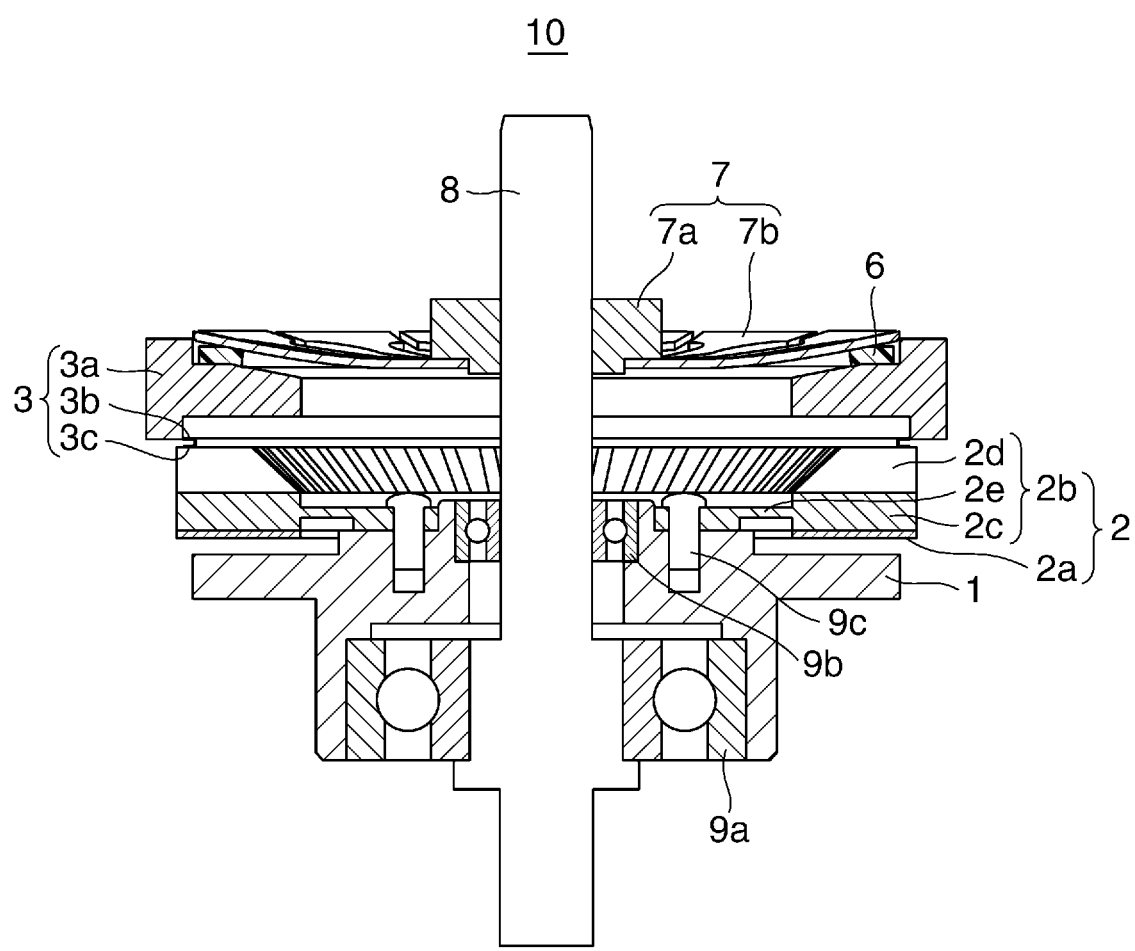
FIG. 1 is a cross-sectional view schematically showing an arrangement of a vibration-type drive apparatus according to a first embodiment of the present invention.

FIG. 1 is a cross-sectional view schematically showing an arrangement of a vibration-type drive apparatus 10 according to a first embodiment of the present invention. The vibration-type drive apparatus 10 has a vibrating body 2, a driven body 3, a spring receiving rubber 6, a pressurizing member 7, and an output shaft 8.

The vibrating member 2 has an annular elastic body 2$b$, and a piezoelectric element 2$a$ which is bonded to a lower surface (first surface) of the elastic body 2$b$ using an adhesive agent. Applying a predetermined drive voltage (AC voltage) to the piezoelectric element 2$a$, which is an electromechanical energy conversion element, excites travelling vibration waves of the vibrating body 2 and causes an elliptic motion on a surface of the elastic body 2$b$ on the driven body 3 side. As a result, the driven body 3 is frictionally driven by the vibrating body 2 and changes its position relative to the vibrating body 2, that is, rotates. It should be noted that the principle on which traveling vibration waves of the vibrating body 2 are generated is well known, and hence detailed description thereof is omitted here.

The elastic body 2$b$ has a base portion 2$c$, a projecting portion 2$d$ that is formed in a manner extending from the base portion 2$c$ to an upper surface of (second surface) of the elastic body 2$b$, and a flange portion 2$e$ that extends from the base portion 2$c$ toward the output shaft 8 and fixed to a housing 1, which is a fixing member. The elastic body 2$b$ is an elastic member made of a metallic material such as stainless steel. In the elastic body 2$b$, the projecting portion 2$d$ is provided along an outer periphery of the base portion 2$c$ and concentrically about a central axis of the elastic body 2$b$. An upper surface of the projecting portion 2$d$, which is a surface on the driven body 3 side, is a sliding surface that comes into frictional contact with the driven body 3. Further, the upper surface of the projecting portion 2$d$ is subjected to nitriding treatment (hardening treatment) so as to improve durability (abrasion resistance). The vibrating body 2 is fixed to the housing 1 by fastening the flange portion 2$e$ of the elastic body 2$b$ to the housing 1 using a fixing screw 9$c$.

The driven body 3 has an annular main body 3$a$ made of an elastic material, a contact portion 3$c$ having a sliding surface that comes into frictional contact with the projecting portion 2$d$ of the vibrating body 2, and a supporting portion 3$b$ that connects the main body 3$a$ and the contact portion 3$c$ together. In the present embodiment, the driven body 3 is made of stainless steel that has been subjected to quenching. The supporting portion 3b and the contact portion 3c are formed with such a thickness as to be elastic, and this brings the contact portion 3c into contact with the projecting portion 2d in a stable manner.

The annular spring receiving rubber 6 disposed on an upper surface of the driven body 3 is urged by the driven body 3 through pressure applied from the pressurizing member 7. The spring receiving rubber 6 is a vibration damping member made of a resin material such as butyl rubber or silicone rubber with high capability to damp vibrations. Thus, the spring receiving rubber 6 has a function of applying pressure from the pressurizing member 7 uniformly to the driven body 3 and reliably bringing the vibrating body 2 and the driven body 3 into stable contact with each other. Namely, while the vibration-type drive apparatus 10 is running, the spring receiving rubber 6 damps undesired vibration of the driven body 3 and also inhibits transmission of vibrations from the driven body 3 to the pressurizing member 7. This reduces generation of noise and stabilizes output characteristics such as rotational speed and torque while the vibration-type drive apparatus 10 is running. Further, elastic deformation of the spring receiving rubber 6 mitigates the effect which the flatness of a surface of the driven body 3 which comes into contact with the spring receiving rubber 6 has on drive characteristics of the vibration-type drive apparatus 10.

The pressurizing member 7 has a spring holding member 7a and a pressurizing spring 7b. The pressurizing spring 7b is an annular plate spring, of which an inner peripheral portion is attached to the spring holding member 7a engaged with and fixed on the output shaft 8. The pressurizing spring 7b transmits rotary driving force of the driven body 3 to the output shaft 8 via the spring holding member 7a by rotating integrally with the driven body 3 via the spring receiving rubber 6. The output shaft 8 is pivotally supported by a pair of rolling bearings 9a and 9b each having an outer ring fixed to the housing 1 and an inner ring fitted in an outer periphery of the output shaft 8. A preload corresponding to the amount of deformation of the pressurizing spring 7b for bringing the driven body 3 into pressure contact with the vibrating body 2 through proper force is imposed on the inner ring of the rolling bearing 9a. This eliminates looseness of the rolling bearing 9a in a radial direction and inhibits runout of the output shaft 8 in a radial direction.

Figure 2A:
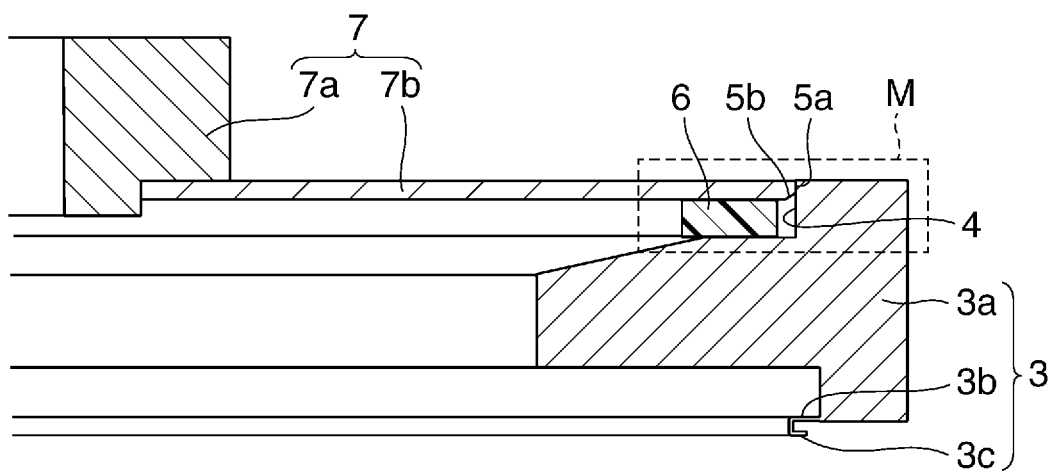
FIG. 2A is a cross-sectional view partially showing a state before a driven body is pressurized against a vibrating body during assembly of the vibration-type drive apparatus in FIG. 1.
Figure 2B:
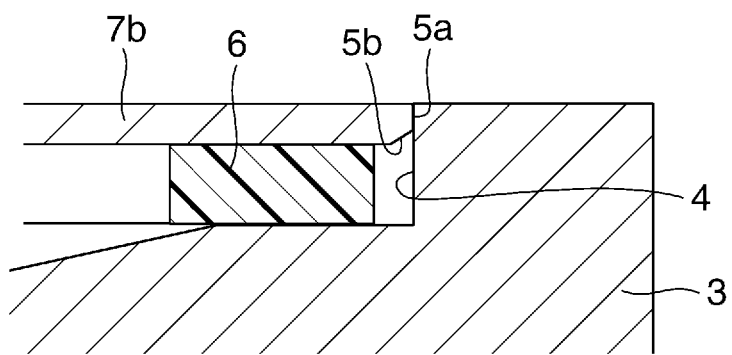
FIG. 2B is a partially enlarged view of FIG. 2A.
Figure 3A:
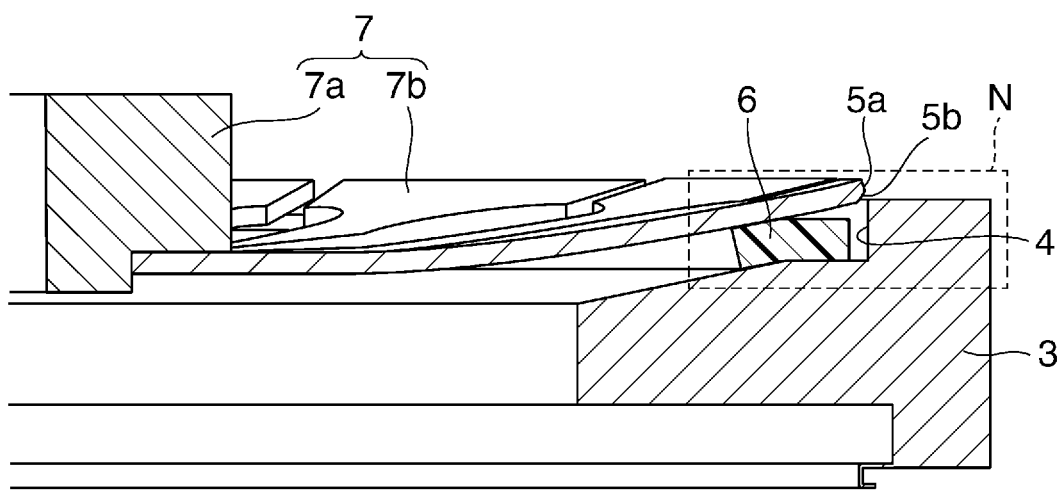
FIG. 3A is a cross-sectional view partially showing a state after the driven body is pressurized against the vibrating body during assembly of the vibration-type drive apparatus in FIG. 1.
Figure 3B:
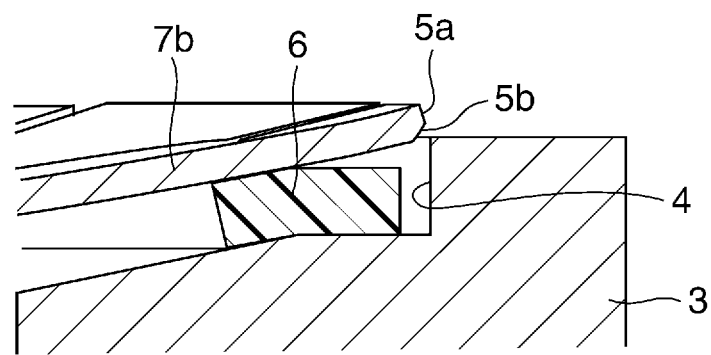
FIG. 3B is a partially enlarged view of FIG. 3A.

FIG. 2A is a cross-sectional view partially showing a state before the driven body 3 is pressurized against the vibrating body 2 by the pressurizing member 7 during assembly of the vibration-type drive apparatus 10, and FIG. 2B is an enlarged view showing an area M in FIG. 2A. FIG. 3A is a cross-sectional view partially showing a state after the driven body 3 is pressurized against the vibrating body 2 by the pressurizing member 7 during assembly of the vibration-type drive apparatus 10, and FIG. 3B is an enlarged view showing an area N in FIG. 3A.

The pressurizing spring 7b is formed by etching stainless steel for a spring, and a positioning portion 5a is provided on an outer peripheral end face of the pressurizing spring 7b. A corner portion of an outer peripheral end of the pressurizing spring 7b on the driven body 3 side is chamfered toward an inner diameter side to form a recess portion 5b. On the other hand, in the main body 3a of the driven body 3, a fitting-receiving portion 4 able to fit onto the positioning portion 5a of the pressurizing spring 7b is provided as a wall parallel to a thrusting direction of the output shaft 8. In the present embodiment, a tolerance of the positioning portion 5a is g6 (tolerance range: −9 µm to −25 µm) and a tolerance of the fitting-receiving portion 4 is H7 (tolerance range: +25 µm to 0 µm) so that a pair of the positioning portion 5a and the fitting-receiving portion 4 can be brought into abutment with each other in a relationship called a clearance fit. As a result, the position of the driven body 3 in a radial direction is restricted by the pressurizing member 7, and misalignment of a central axis of the driven body 3 and a central axis of the output shaft 8 in the radial direction is kept within an acceptable range.

The output shaft 8 is supported by the rolling bearings 9a and 9b fixed to the housing 1 so that misalignment of a central axis of the vibrating body 2 fixed to the housing 1 and the central axis of the output shaft 8 in the radial direction can be kept within an acceptable range. Thus, the position of the driven body 3 in the radial direction is restricted by the positioning portion 5a of the pressurizing spring 7b before the driven body 3 is pressurized against the vibrating body 2 by the pressurizing spring 7b during assembly of the vibration-type drive apparatus 10. As a result, misalignment of the central axis of the driven body 3 with respect to the central axis of the vibrating body 2 in the radial direction is kept within an acceptable range.

Sliding the spring holding member 7 toward the vibrating body 2 in the thrusting direction of the output shaft 8 elastically deforms the pressurizing spring 7b being in the state shown in FIGS. 2A and 2B. As a result, the pressurizing spring 7b applies pressure from the driven body 3 to the vibrating body 2 in the thrusting direction of the output shaft 8 via the spring receiving rubber 6. It should be noted that in the following description, the thrusting direction of the output shaft 8 will be referred to as the pressurizing direction of the pressurizing spring 7b as appropriate.

Then, the positioning portion 5a of the pressurizing spring 7b moves away from the driven body 3 in the pressurizing direction. This reduces an area where the positioning portion 5a and the fitting-receiving portion 4 are fitted together. The spring holding member 7a is then moved until a predetermined pressure required for the vibration-type drive apparatus 10 is reached. Then, as shown in FIGS. 3A and 3B, the pressurizing spring 7b is further elastically deformed to release the fit between the positioning portion 5a of the pressurizing spring 7b and the fitting-receiving portion 4 from each other and bring the driven body 3 and the pressurizing spring 7b out of contact with each other. At this time, as the pressurizing spring 7b is elastically deformed, the corner portion of the outer peripheral end of the pressurizing spring 7b is displaced on the driven body 3 side in a manner expanding toward an outer peripheral side, but the driven body 3 and the pressurizing spring 7b are not brought into contact with other since the recess portion 5b is provided in the corner portion. It should be noted that when the spring holding member 7a is moved so as to release pressure in the state shown in FIGS. 3A and 3B, the positioning portion 5a and the fitting-receiving portion 4 are brought into abutment with each other (fitted together) again.

When a pressure is applied from the pressurizing spring 7b to the driven body 3, a frictional force is generated between the driven body 3 and the spring receiving rubber 6. For this reason, even when the fit between the positioning portion 5a and the fitting-receiving portion 4 is released, the driven body 3 is fixed by the frictional force so as not to be displaced in the radial direction. Thus, the position of the driven body 3 in the radial direction is kept unchanged before and after a pressure arising from deformation of the pressurizing spring 7b is applied, and as a result, a predetermined pressure required to bring the driven body 3 into pressure contact with the vibrating body 2 is applied.

As described above, the vibration-type drive apparatus 10 is configured such that when the pressurizing spring 7b is deflected in the process of assembly, the fit between the positioning portion 5a and the fitting-receiving portion 4 is released, and they are brought out of contact with each other, and while the vibration-type drive apparatus 10 is running, the positioning portion 5a and the fitting-receiving portion 4 are kept out of contact with each other. As a result, in the vibration-type drive apparatus 10 after assembly, the amount of deflection of the pressurizing spring 7b is greater than the length of the fitting-receiving portion 4 in the pressurizing direction of the pressurizing spring 7b.

Here, "the amount of deflection of the pressurizing spring 7b" is a difference between the length of the pressurizing spring 7b in the pressurizing direction when the pressurizing spring 7b applies a pressure to the driven body 3 (the spring receiving rubber 6) and the length of the pressurizing spring 7b in the pressurizing direction when the pressurizing spring 7b applies no pressure to the driven body 3 (the spring receiving rubber 6). In other words, the amount of deflection of the pressurizing spring 7b means the amount of deflection of the pressurizing spring 7b from its pivot point to an end in the pressurizing direction of the pressurizing spring 7b when the pressurizing spring 7b applies a pressure to the driven body 3 (the spring receiving rubber 6).

The "length of the fitting-receiving portion 4" means the length of a part of the fitting-receiving portion 4 which is fitted onto the positioning portion 5a in the pressurizing direction of the pressurizing spring 7b while the pressurizing spring 7b is generating no pressure, and is not the total length of the fitting-receiving portion 4 in the pressurizing direction of the pressurizing spring 7b. In the vibration-type drive apparatus 10, the length of the fitting-receiving portion 4 is the length required to release the positioning portion 5a from the fitting-receiving portion 4 in the pressurizing direction of the pressurizing spring 7b, that is, the length of the positioning portion 5a in the thrusting direction of the output shaft 8 (see FIG. 2A).

It should be noted that the amount of deflection of the pressurizing spring 7b varies with spring constants. As the spring constant of the pressurizing spring 7b increases, the amount of deflection decreases, and at least the pressurizing spring 7b needs to be deflected by such an amount as to release the positioning portion 5a from the bearing portion 4. Thus, in the vibration-type drive apparatus 10, the amount of deflection of the pressurizing spring 7b is greater than the length of the fitting-receiving portion 4 defined above in the pressurizing direction of the pressurizing spring 7b (the thrusting direction of the output shaft 8) regardless of spring constants.

As described above, misalignment of the central axis of the vibrating body 2 and the central axis of the driven body 3 is kept within an acceptable range, and eccentricity of the driven body 3 is suppressed without using assembly jigs that have decreased productivity and restricted the shape of a vibration-type drive apparatus. Moreover, when the vibration-type drive apparatus 10 is in use (running), the pressurizing spring 7b and the driven body 3 are not in contact with each other, and hence undesired vibration of the vibration-type drive apparatus 10 does not occur, and this prevents transmission of undesired vibration of the driven body 3 via the pressurizing spring 7b.

In the present embodiment, the recess portion 5b provided in the pressurizing spring 7b is formed by chamfering the corner portion of the outer peripheral end of the pressurizing spring 7b on the driven body 3 side toward the inner diameter side. The recess portion 5b, however, is not limited to this arrangement. Thus, a description of a variation of the pressurizing spring 7b will now be given.

Figure 4A:
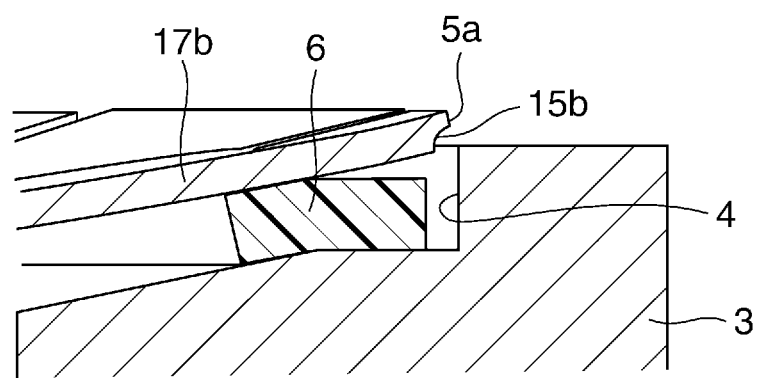
FIGS. 4A and 4B are cross-sectional views showing structures of outer peripheral ends of pressurizing members according to a first variation and a second variation of a pressurizing member constituting the vibration-type drive apparatus in FIG. 1.

FIG. 4A is a cross-sectional view showing a structure of an outer peripheral end of a pressurizing spring 17b which is a first variation of the pressurizing spring 7b. The pressurizing spring 17b has a structure in which side etching is caused in the corner portion of the outer peripheral end on the driven body 3 side by etching to form a recess portion 15b with an arc shape on an inner diameter side. Here, the recess portion 15b is formed by removing a part of the pressurizing spring 17b up to a half its plate thickness, but the recess portion 15b has only to be formed such that the outer peripheral end of the pressurizing spring 17b does not come into contact with the fitting-receiving portion 4 of the driven body 3 when a pressure is applied by the pressurizing spring 17b.

Figure 4B:
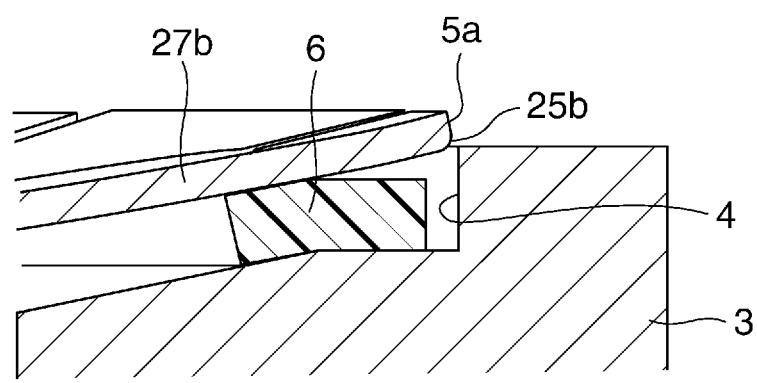

FIG. 4B is a cross-sectional view showing a structure of an outer peripheral end of a pressurizing spring 27b which is a second variation of the pressurizing spring 7b. In the pressurizing spring 27b, a recess portion 25b is formed by shear drop through press working. As with the recess portions 5b and 15b, the recess portion 25b as well has only to be formed such that the outer peripheral end of the pressurizing spring 27b does not come into contact with the fitting-receiving portion 4 of the driven body 3 when a pressure is applied by the pressurizing spring 17b.

Figure 5:
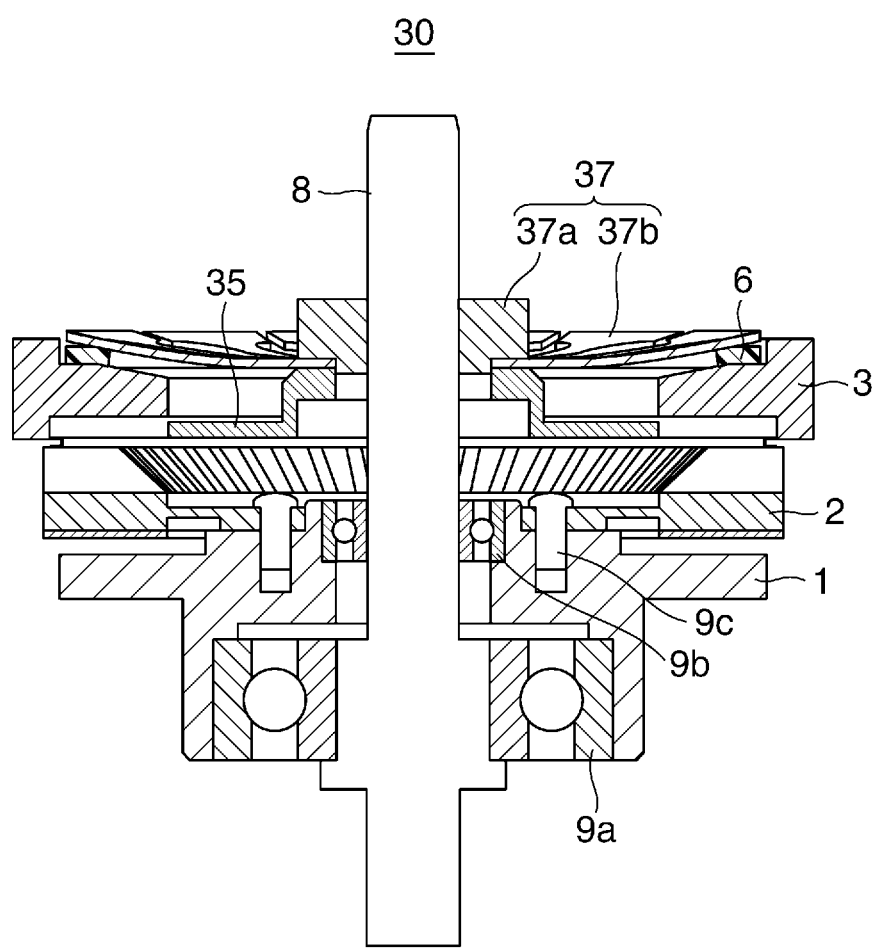
FIG. 5 is a cross-sectional view schematically showing an arrangement of a vibration-type drive apparatus according to a second embodiment of the present invention.

FIG. 5 is a cross-sectional view schematically showing an arrangement of a vibration-type drive apparatus 30 according to a second embodiment of the present invention. Component elements of the vibration-type drive apparatus 30 which are the same as the component elements of the vibration-type drive apparatus 10 according to the first embodiment described above are designated by the same reference numerals, and description thereof is omitted. The vibration-type drive apparatus 30 has a positioning member 35 and a pressurizing member 37, and the pressurizing member 37 has a spring-holding member 37a and a pressurizing spring 37b. The spring-holding member 37a is the same as the spring holding member 7a of the pressurizing member 7 constituting the vibration-type drive apparatus 10.

Figure 6A:
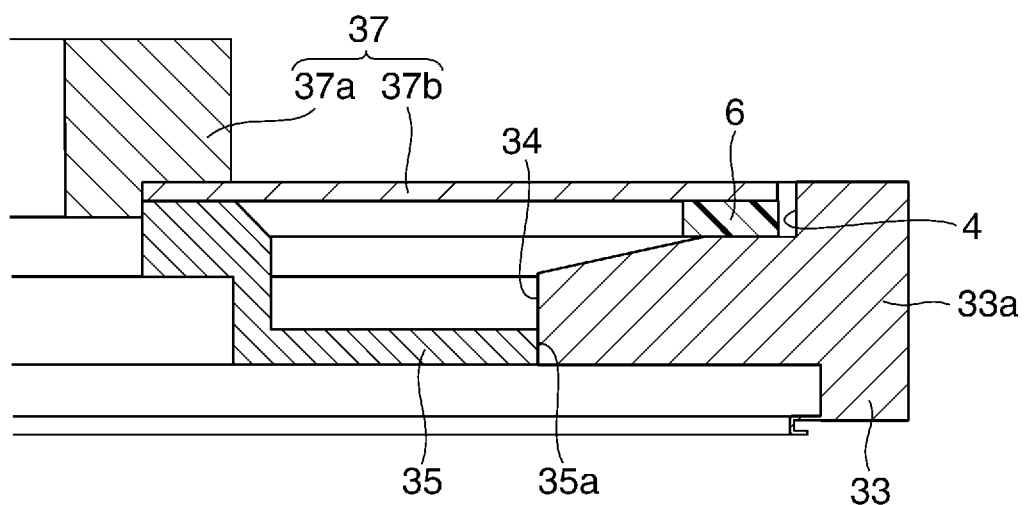
FIG. 6A and FIG. 6B are cross-sectional views partially showing states before and after the driven body is pressurized against the vibrating body during assembly of the vibration-type drive apparatus in FIG. 5.
Figure 6B:
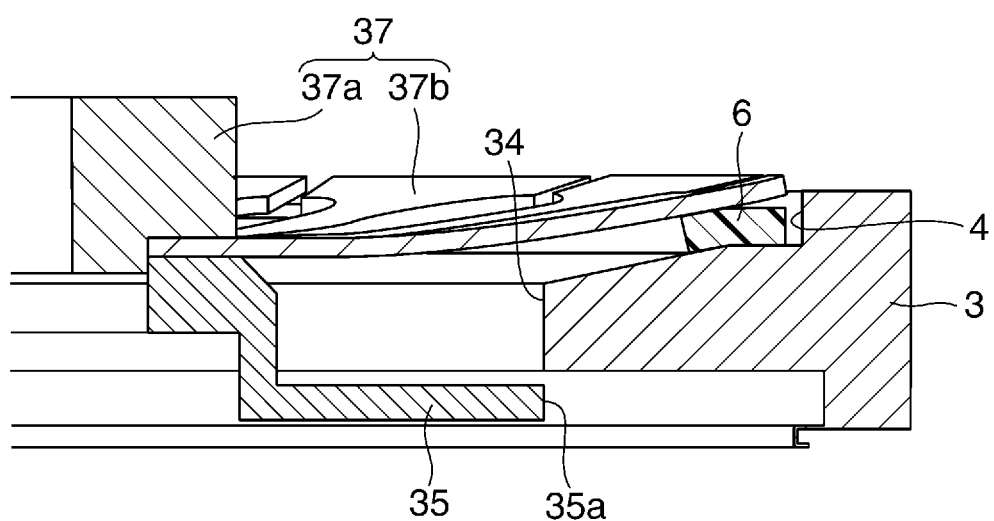

FIG. 6A is a cross-sectional view partially showing a state before the driven body 3 is pressurized against the vibrating body 2 by the pressurizing member 37 during assembly of the vibration-type drive apparatus 30. FIG. 6B is a cross-sectional view partially showing a state after the driven body 3 is pressurized against the vibrating body 2 by the pressurizing member 37 during assembly of the vibration-type drive apparatus 30.

An inner peripheral portion of the pressurizing spring 37b is sandwiched between the spring holding member 37a, which is fitted and fixed to the output shaft 8, and the positioning member 35. The pressurizing spring 37b transmits rotary driving force of the driven body 3 to the output shaft 8. It should be noted that although in the present embodiment, the pressurizing spring 37b and the positioning member 35 are in direct contact with each other, this is not limitative, but they may be in indirect contact with each other via something interposed between them. A positioning portion 35a is provided at an end of the positioning member 35 on an outer peripheral side, and a fitting-receiving portion 34 which is to be fitted onto the positioning portion 35a of the positioning member 35 is provided on an inner peripheral side of the driven body 3. It should be noted that two fitting-receiving portions 4 and 34 are provided on the driven body 3, and the fitting-receiving portion 4 is used in the first embodiment whereas the fitting-receiving portion 34 is used in the second embodiment.

A tolerance of the positioning member 35 is h6 (tolerance range: 0 μm to −16 μm) and a tolerance of the fitting-receiving portion 34 is H7 (tolerance range: +25 μm to 0 μm) so that a pair of the positioning portion 35a and the fitting-receiving portion 34 can have a relationship of a clearance fit close to a transition fit. As a result, the position of the driven body 3 in a radial direction is restricted by the positioning member 35, and misalignment of a central axis of the driven body 3 and a central axis of the output shaft 8 in the radial direction is kept within an acceptable range. Thus, in the state before the driven body 3 is pressurized against the vibrating body 2 by the pressurizing member 37 during assembly of the vibration-type drive apparatus 30, misalignment of the central axis of the driven body 3 with respect to a central axis of the vibrating body 2 in the radial direction is kept within an acceptable range.

Elastically deforming the pressurizing spring 37b being in the state shown in FIG. 6A applies pressure from the driven body 3 to the vibrating body 2 via the spring receiving rubber 6. Then, as the pressurizing spring 37b is elastically deformed, the spring holding member 37a and the positioning member 35 integrally move toward the vibrating body 2. When a required predetermined pressure is reached, the fit between the positioning portion 35a of the positioning member 35 and the fitting-receiving portion 34 of the driven body 3 is released, and the driven body 3 and the positioning member 35 are brought out of contact with each other as shown in FIG. 6B.

As with the vibration-type drive apparatus 10 according to the first embodiment described above, in the vibration-type drive apparatus 30 as well, the amount of deflection of the pressurizing spring 37b is greater than the length of the fitting-receiving portion 34 in a pressurizing direction of the pressurizing spring 37b (a thrusting direction of the output shaft 8). Here, the "length of the fitting-receiving portion 34" means the length of a part of the fitting-receiving portion 34 which is fitted onto the positioning portion 35a in the pressurizing direction of the pressurizing spring 37b and is here the same as the thickness of the positioning portion 35a in the thrusting direction of the output shaft 8. When this condition is satisfied, the positioning member 35 and the driven body 3 are brought out of contact with each other.

It should be noted that in the vibration-type drive apparatus 30, an outer diameter of the pressurizing spring 37b is determined so that a predetermined gap can be formed between an outer peripheral end face of the pressurizing spring 37b and the fitting-receiving portion 34 of the driven body 3. For this reason, an outer peripheral end of the pressurizing spring 37b does not come into contact with the fitting-receiving portion 34 while the pressurizing spring 37b is being elastically deformed.

When a pressure is applied from the pressurizing spring 37b, a frictional force is generated between the driven body 3 and the spring receiving rubber 6, and for this reason, even when the fit between the positioning portion 35a and the fitting-receiving portion 34 is released, the driven body 3 is not displaced in the radial direction. Thus, the position of the driven body 3 in the radial direction, which was restricted before the pressurization by the pressurizing spring 37b, is maintained, and a predetermined pressure required to bring the driven body 3 into pressure contact with the vibrating body 2 is applied. As is apparent from the above description, the vibration-type drive apparatus 30 according to the second embodiment as well obtains the same effects as those obtained by the vibration-type drive apparatus 10 according to the first embodiment.

Figure 7:
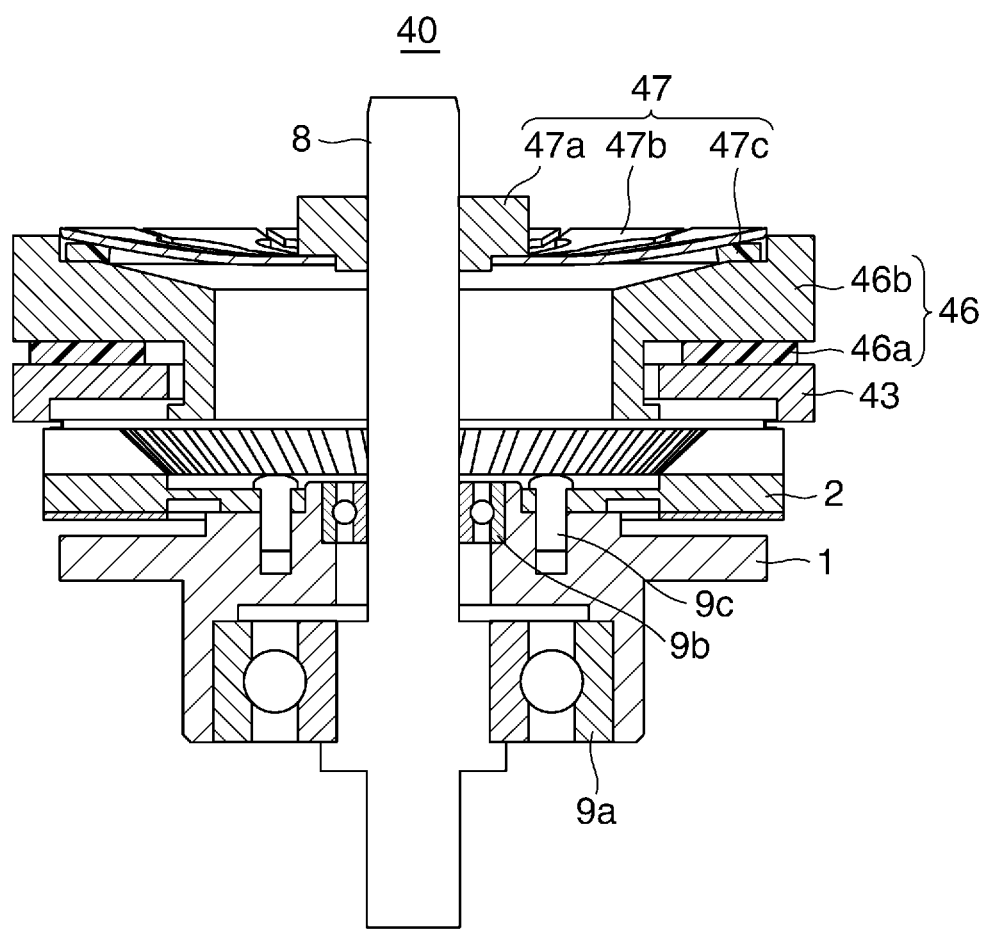
FIG. 7 is a cross-sectional view schematically showing an arrangement of a vibration-type drive apparatus according to a third embodiment of the present invention.

FIG. 7 is a cross-sectional view schematically showing an arrangement of a vibration-type drive apparatus 40 according to a third embodiment of the present invention. Component elements of the vibration-type drive apparatus 40 which are the same as the component elements of the vibration-type drive apparatus 10 according to the first embodiment described above are designated by the same reference numerals, and description thereof is omitted.

The vibration-type drive apparatus 40 has a driven body 43, a spring receiving member 46, and a pressurizing member 47. As compared to the driven body 3 according to the first embodiment described above, the driven body 43 differs from the driven body 3 only in the shape of a main body 43a (see FIG. 8A and FIG. 8B) and has the same portions as the supporting portion 3b and the contacting portion 3c (no reference numerals are shown in FIGS. 6A and 6B), which are provided in the driven body 3. The spring receiving member 46 has a damping rubber 46a and a weight member 46b. The pressurizing member 47 has a spring holding member 47a, a pressurizing spring 47b, and a spring receiving rubber 47c.

Figure 8A:
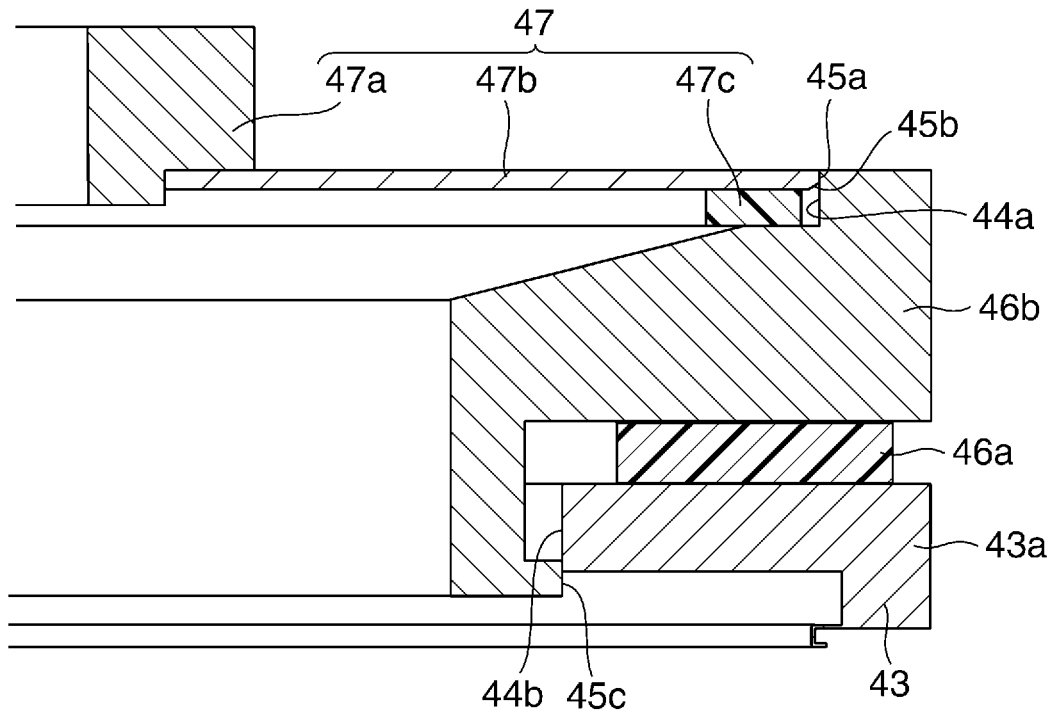
FIG. 8A and FIG. 8B are cross-sectional views partially showing states before and after the driven body is pressurized against the vibrating body during assembly of the vibration-type drive apparatus in FIG. 7.
Figure 8B:
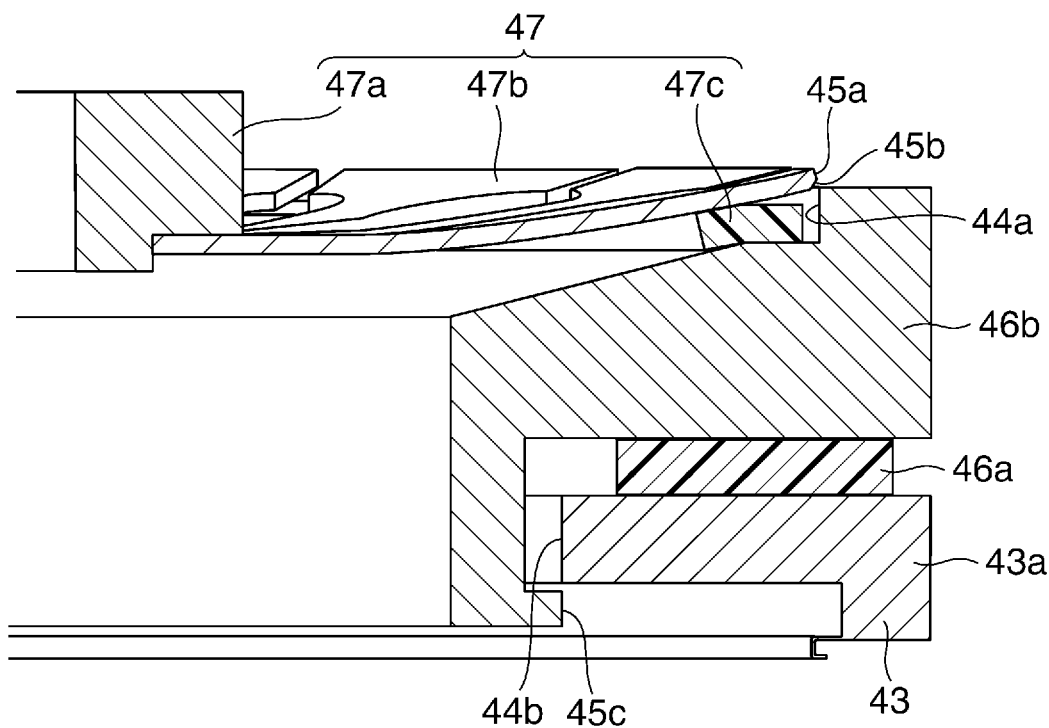

FIG. 8A is a cross-sectional view partially showing a state before the driven body 43 is pressurized against the vibrating body 2 by the pressurizing member 47 during assembly of the vibration-type drive apparatus 40. FIG. 8B is a cross-sectional view partially showing a state after the driven body 43 is pressurized against the vibrating body 2 by the pressurizing member 47 during assembly of the vibration-type drive apparatus 40.

The damping rubber 46a has an annular shape and is made of a resin material such as butyl rubber or silicone rubber with high capability to damp vibrations. The weight member 46b has an annular shape and is made of an elastic material. Examples of elastic materials for the weight member 46b include brass, but this is not limitative. The damping rubber 46a and the weight member 46b prevent undesired vibration of the driven body 43 from occurring while the vibration-type drive apparatus 40 is running, and this reduces generation of abnormal noise and prevents power reduction.

The spring receiving rubber 47c is made of a resin material such as butyl rubber or chloroprene rubber. Elastic deformation of the spring receiving rubber 47c mitigates the effect which the flatness of a surface of the weight member 46 with which the spring receiving rubber 47c comes into contact has on drive characteristics of the vibration-type drive apparatus 40. Namely, pressure from the pressurizing spring 47b, which is an annular plate spring, is evenly applied to the driven body 43 in a rotational direction, and this keeps the vibrating body 2 and the driven body 43 in stable contact with each other.

A first positioning portion 45a is provided on an outer peripheral end face of the pressurizing spring 47b, and a corner portion of an outer peripheral end of the pressurizing spring 47b on the weight member 46b side is chamfered toward an inner diameter side to form a recess portion 45b. On the other hand, on a surface perpendicular to a surface of the weight member 46b on which the spring receiving rubber 47c is provided, a first fitting-receiving portion 44a which is to be fitted onto the first positioning portion 45a of the pressurizing spring 47b is provided. In the present embodiment, a tolerance of the first positioning portion 45a is g6, and a tolerance of the fitting-receiving portion 44a is H7 so that the first positioning portion 45a and the fitting-receiving portion 44 can have a relationship of a clearance fit.

A second positioning portion 45c for the driven body 43 is provided on an outer peripheral surface of a bottom portion of the weight member 46*b*, and on an inner peripheral side of the main body 43*a* of the driven body 43, a second fitting-receiving portion 44*b* which is to be fitted onto the second positioning portion 45*c* is provided. In the present embodiment, a tolerance of the second positioning portion 45*c* is g6, and a tolerance of the second fitting-receiving portion 44*b* is H7 so that the second positioning portion 45*c* and the second fitting-receiving portion 44*b* can have a relationship of a clearance fit as with the first positioning portion 45*a* and the fitting-receiving portion 44*a*.

As described above, the vibration-type drive apparatus 40 has multiple pairs (specifically, two pairs here) of a positioning portion and a fitting-receiving portion. This, however, is not limitative, but the vibration-type drive apparatuses according to the embodiments of the present invention may be configured to have three or more pairs of a positioning portion and a fitting-receiving portion.

To assemble the vibration-type drive apparatus 40, first, the driven body 43, the damping rubber 46*a*, and the weight member 46*b* are stacked in this order on a sliding surface (upper surface) of the vibrating body 2 which slides in contact with the driven body 43. As a result, the second positioning portion 45*c* of the weight member 46*b* are fitted to the second fitting-receiving portion 44*b* of the driven body 43, and hence misalignment of a central axis of the driven body 43 and a central axis of the weight member 46*b* in a radial direction is kept within an acceptable range.

Next, the spring receiving rubber 47*c* and the spring holding member 47*a*, to which the pressurizing spring 47*b* is attached, are stacked on an upper surface of the weight member 46*b* while being fitted to the output shaft 8. At this time, the first positioning portion 45*a* of the pressurizing spring 47*b* is fitted to the first fitting-receiving portion 44*a* of the weight member 46*b*. As a result, the position of the weight member 46*b* in the radial direction is restricted by the pressurizing member 47, and misalignment of the central axis of the weight member 46*b* and a central axis of the output shaft 8 in the radial direction is kept within an acceptable range. Thus, in the state before the driven body 43 is pressurized against the vibrating body 2 by the pressurizing member 47, misalignment of the central axis of the driven body 43 with respect to a central axis of the vibrating body 2 in the radial direction is kept within an acceptable range.

The pressurizing spring 47*b* in the state shown in FIG. 8A is elastically deformed to apply pressure from the driven body 43 to the vibrating body 2 via the spring receiving rubber 47*c*. This causes the first positioning portion 45*a* of the pressurizing spring 47*b* to move away from the weight member 46*b* in a pressurizing direction. Also, the damping rubber 46*a* is elastically deformed, and the weight member 46*b* moves closer to the vibrating body 2 in the pressurizing direction. As pressure is increased until a required predetermined pressure is reached, the fit between the first positioning portion 45*a* of the pressurizing spring 47*b* and the first fitting-receiving portion 44*a* of the weight member 46*b* is released, and the weight member 46*b* and the pressurizing spring 47*b* are brought out of contact with each other as shown in FIG. 8B. Likewise, the fit between the second positioning portion 45*c* of the weight member 46*b* and the second fitting-receiving portion 44*b* of the driven body 43 is released, and the driven body 43 and the weight member 46*b* are brought out of contact with each other.

It should be noted that the corner portion of the outer peripheral end of the pressurizing spring 47*b* on the weight member 46*b* side is displaced in a manner expanding toward an outer peripheral side as the pressurizing spring 47*b* is elastically deformed, but the weight member 46*b* and the pressurizing spring 47*b* do not come into contact with other since the recess portion 45*b* is provided in the corner portion. The thickness of the second positioning portion 45*c* in the pressurizing direction is set at such a thickness that the second positioning portion 45*c* is completely brought out of contact with the second fitting-receiving portion 44*b* when the weight member 46*b* has moved in response to a required predetermined pressure being applied in the vibration-type drive apparatus 40.

When a pressure is applied from the pressurizing spring 47*b*, a frictional force is generated between the driven body 43 and the damping rubber 46*a* and between the weight member 46*b* and the spring receiving rubber 47*c*. As a result, even when both the fit between the first positioning portion 45*a* and the first fitting-receiving portion 44*a* and the fit between the second positioning portion 45*c* and the second fitting-receiving portion 44*b* are released, the driven body 43 is held by the frictional force so as not to be displaced in the radial direction. Thus, a predetermined pressure required for the vibration-type drive apparatus 40 is allowed to be applied while the position of the driven body 43, which was restricted before the pressurization by the pressurizing spring 47*b*, is maintained.

As described above, in the present embodiment, only by stacking necessary components (the driven body 43, the spring receiving member 46, and the pressurizing member 47) on the vibrating body 2, the vibration-type drive apparatus 40 is assembled while eccentricity of the driven body 43 is suppressed. Thus, the vibration-type drive apparatus 40 is assembled without using jigs, and this considerably increases productivity. Moreover, since the two positioning portions are in the non-contacting state when the vibration-type drive apparatus 40 is in use (running), undesired vibration of the vibration-type drive apparatus 40 is prevented from occurring.

Figure 9:
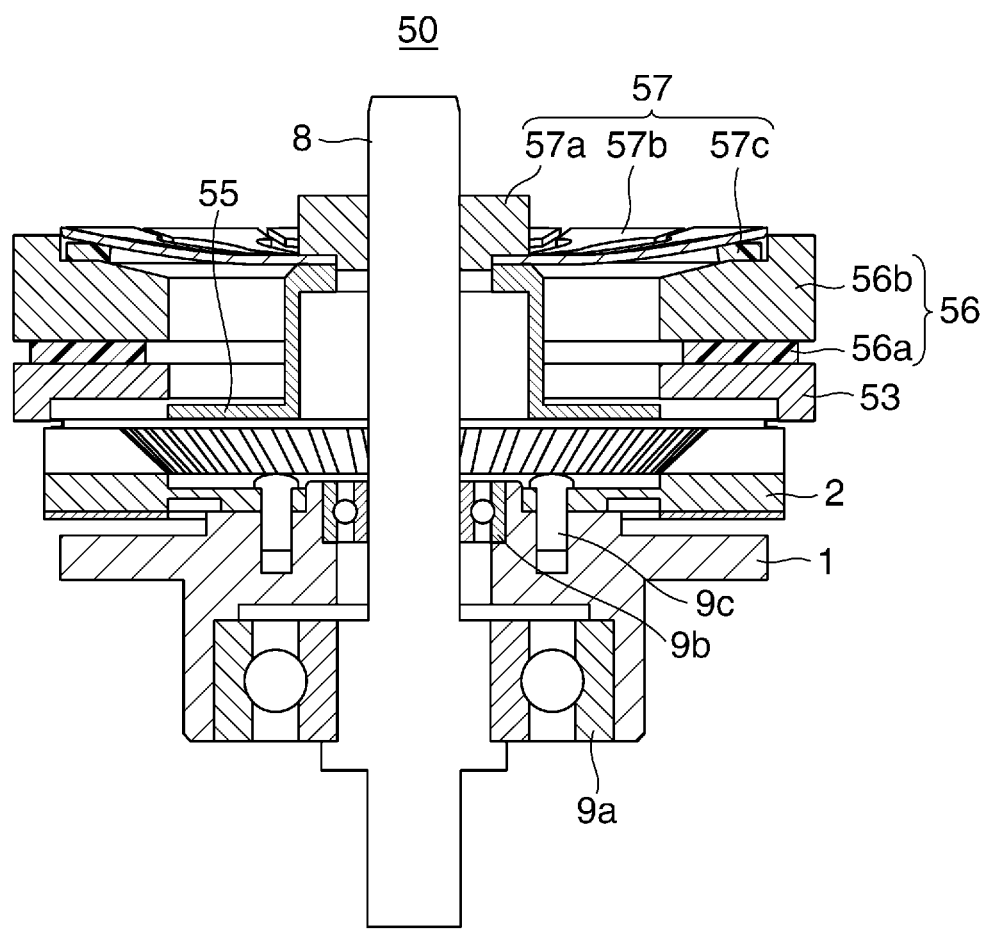
FIG. 9 is a cross-sectional view schematically showing an arrangement of a vibration-type drive apparatus according to a fourth embodiment of the present invention.

FIG. 9 is a cross-sectional view schematically showing an arrangement of a vibration-type drive apparatus 50 according to a fourth embodiment of the present invention. Component elements of the vibration-type drive apparatus 50 which are the same as the component elements of the vibration-type drive apparatus 10 according to the first embodiment described above are designated by the same reference numerals, and description thereof is omitted.

The vibration-type drive apparatus 50 has a driven body 53, a positioning member 55, a spring receiving member 56, and a pressurizing member 57. As compared to the driven body 3 according to the first embodiment described above, the driven body 53 differs from the driven body 3 only in the shape of a main body 53*a* (see FIG. 10A and FIG. 10B) and has the same portions as the supporting portion 3*b* and the contacting portion 3*c* (no reference numerals are shown in FIG. 9), which are provided in the driven body 3. The spring receiving member 56 has a damping rubber 56*a* and a weight member 56*b*. The pressurizing member 57 has a spring holding member 57*a*, a pressurizing spring 57*b*, and a spring receiving rubber 57*c*.

Figure 10A:
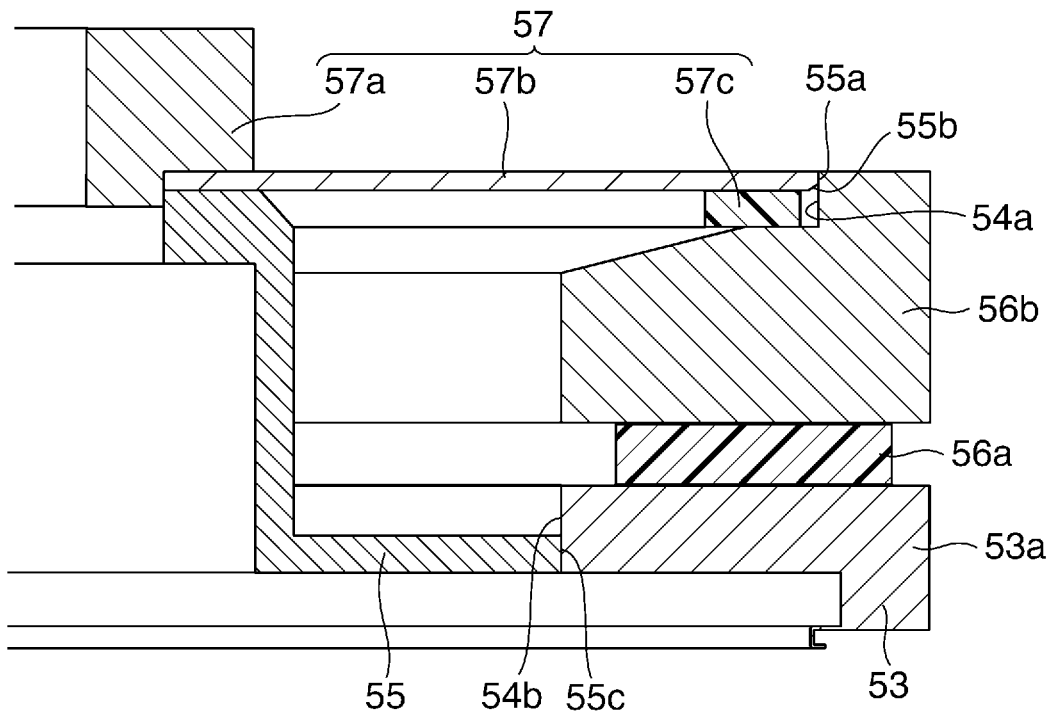
FIG. 10A and FIG. 10B are cross-sectional views partially showing states before and after the driven body is pressurized against the vibrating body during assembly of the vibration-type drive apparatus in FIG. 9.
Figure 10B:
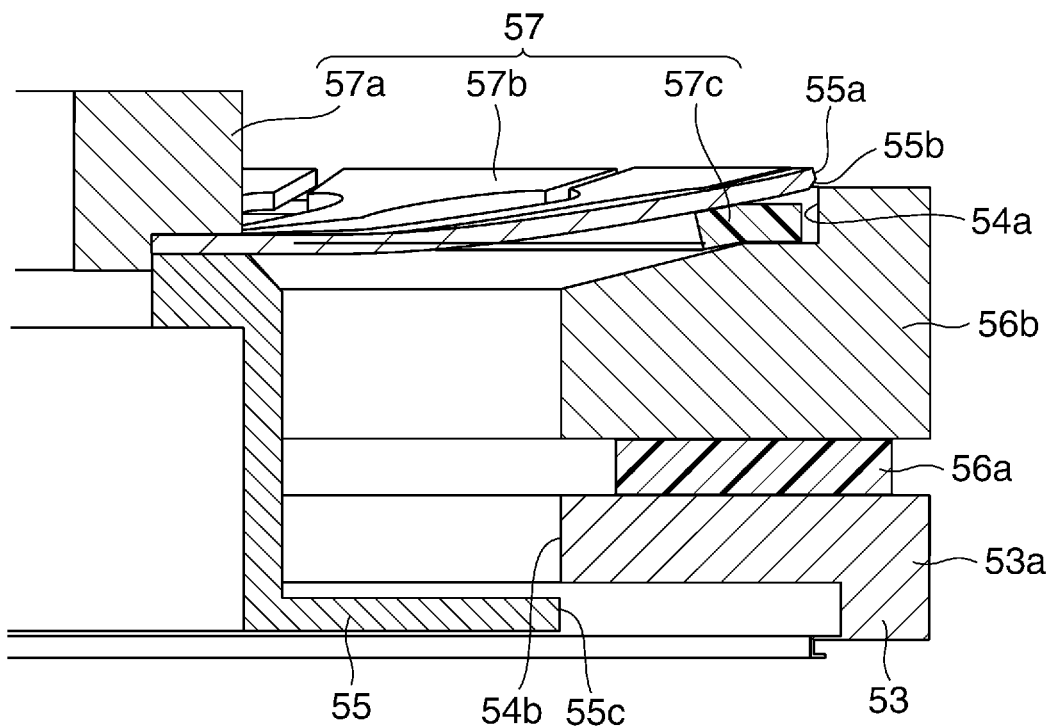

FIG. 10A is a cross-sectional view partially showing a state before the driven body 53 is pressurized against the vibrating body 2 by the pressurizing member 57 during assembly of the vibration-type drive apparatus 50. FIG. 10B is a cross-sectional view partially showing a state after the driven body 53 is pressurized against the vibrating body 2 by the pressurizing member 57 during assembly of the vibration-type drive apparatus 50.

As with the vibration-type drive apparatus 40 according to the third embodiment, the damping rubber 56a and the weight member 56b prevent undesired vibration of the driven body 53 from occurring while the vibration-type drive apparatus 50 is running, and this reduces generation of abnormal noise and also prevents power reduction. Moreover, the spring receiving portion 57c applies pressure from the pressurizing spring 57b, which is an annular plate spring, evenly to the driven body 53 in a rotational direction to reliably keep the vibrating body 2 and the driven body 53 in stable contact with each other.

A first positioning portion 55a is provided on an outer peripheral end face of the pressurizing spring 57b, and a corner portion of an outer peripheral end of the pressurizing spring 57b on the weight member 56b side is chamfered toward an inner diameter side to form a recess portion 55b. On the other hand, on a surface perpendicular to a surface of the weight member 56b on which the spring receiving rubber 57c is provided, a first fitting-receiving portion 54a to which the first positioning portion 55a of the pressurizing spring 57b is to be fitted is provided. In the present embodiment, a tolerance of the first positioning portion 55a is g6, and a tolerance of the first fitting-receiving portion 54a is H7 so that the first positioning portion 55a and the first fitting-receiving portion 54a can have a relationship of a clearance fit.

An inner peripheral portion of the pressurizing spring 57b is sandwiched between the spring holding member 57a, which is fitted and fixed to the output shaft 8, and the positioning member 55. The pressurizing spring 57b transmits rotary driving force of the driven body 53 to the output shaft 8. It should be noted that although in the present embodiment, the pressurizing spring 57b and the positioning member 55 are in direct contact with each other, this is not limitative, but they may be in indirect contact with each other via something interposed between them.

A second positioning portion 55c is provided at an end of the positioning member 55 on an outer peripheral side, and on an inner peripheral side of the driven body 53, a second fitting-receiving portion 54b to which the second positioning portion 55c of the positioning member 55 is to be fitted is provided. In the present embodiment, a tolerance of the second positioning portion 55c is g6, and a tolerance of the second fitting-receiving portion 54b is H7 so that the second positioning portion 55c and the second fitting-receiving portion 54b can have a relationship of a clearance fit as with the first positioning portion 55a and the first fitting-receiving portion 54a.

As described above, the vibration-type drive apparatus 50 has multiple pairs (specifically, two pairs here) of a positioning portion and a fitting-receiving portion.

To assemble the vibration-type drive apparatus 50, first, the driven body 53, the damping rubber 56a, and the weight member 56b are stacked in this order on a sliding surface (upper surface) of the vibrating body 2 which slides in contact with the driven body 53. Next, the spring receiving rubber 57c and the spring holding member 57a, to which the pressurizing spring 57b is attached, are stacked on an upper surface of the weight member 56b while being fitted to the output shaft 8. This causes the second positioning portion 55c of the positioning member 55 to fit to the second fitting-receiving portion 54b of the driven body 53, and hence misalignment of a central axis of the driven body 53 and a central axis of the output shaft 8 in a radial direction is kept within an acceptable range. Also, the first positioning portion 55a of the pressurizing spring 57b is fitted to the first fitting-receiving portion 54a of the weight member 56b. As a result, the position of the weight member 56b in the radial direction is restricted by the pressurizing member 57, and hence misalignment of a central axis of the weight member 56b and the central axis of the output shaft 8 in the radial direction is kept within an acceptable range. Thus, in the state before the driven body 53 is pressurized against the vibrating body 2 by the pressurizing member 57, misalignment of the central axis of the driven body 53 with respect to a central axis of the vibrating body 2 in the radial direction is kept within an acceptable range.

The pressurizing spring 57b in the state shown in FIG. 10A is elastically deformed to apply pressure from the driven body 53 to the vibrating body 2 via the spring receiving rubber 57c and the spring receiving member 56. This causes the first positioning portion 55a of the pressurizing spring 57b to move away from the weight member 56b in a pressurizing direction. Also, as the pressurizing spring 57b is elastically deformed, the spring holding member 57a and the positioning member 55 integrally move toward the vibrating body 2. As pressure is further increased until a required predetermined pressure is reached, the fit between the first positioning portion 55a of the pressurizing spring 57b and the first fitting-receiving portion 54a of the weight member 56b is released, and the weight member 56b and the pressurizing spring 57b are brought out of contact with each other as shown in FIG. 10B. Likewise, the fit between the second positioning portion 55c of the positioning member 55 and the second fitting-receiving portion 54b of the driven body 53 is released, and the driven body 53 and the positioning member 55 are brought out of contact with each other.

It should be noted that the corner portion of the outer peripheral end of the pressurizing spring 57b on the weight member 56b side is displaced in a manner expanding toward an outer peripheral side as the pressurizing spring 57b is elastically deformed, but the weight member 56b and the pressurizing spring 57b do not come into contact with other since the recess portion 55b is provided in the corner portion. The amount of deflection of the pressurizing spring 57b is greater than the length of the second fitting-receiving portion 54b in a pressurizing direction of the pressurizing spring 57b (a thrusting direction of the output shaft 8). Here, the "length of the second fitting-receiving portion 54b" means the length of a part of the second fitting-receiving portion 54b to which the second positioning portion 55c is fitted in the pressurizing direction of the pressurizing spring 57b and is here the same as the thickness of the second positioning portion 55c in the thrusting direction of the output shaft 8. When this condition is satisfied, the second positioning member 55 and the driven body 53 are brought out of contact with each other after the vibration-type drive apparatus 50 is assembled.

In the vibration-type drive apparatus 50, a pressure from the pressurizing spring 57b generates a frictional force between the driven body 53 and the damping rubber 56a and between the weight member 56b and the spring receiving rubber 57c. As a result, even when both the fit between the first positioning portion 55a and the first fitting-receiving portion 54a and the fit between the second positioning portion 55c and the second fitting-receiving portion 54b are released, the driven body 53 is held by the frictional force so as not to be displaced in the radial direction. Thus, a predetermined pressure required for the vibration-type drive apparatus 50 is allowed to be applied while the position of the driven body 53, which was restricted before the pressurization by the pressurizing spring 57b, is maintained.

As described above, in the present embodiment, only by stacking necessary components (the driven body 53, the spring receiving member 56, and the pressurizing member 57) on the vibrating body 2, the vibration-type drive apparatus 50 is assembled while eccentricity of the driven body 53 is suppressed. Thus, the vibration-type drive apparatus 50 is assembled without using jigs, and this considerably increases productivity. Moreover, since the two positioning portions are brought into the non-contacting state when the vibration-type drive apparatus 50 is in use (running), undesired vibration of the vibration-type drive apparatus 50 is prevented from occurring.

Figure 11:
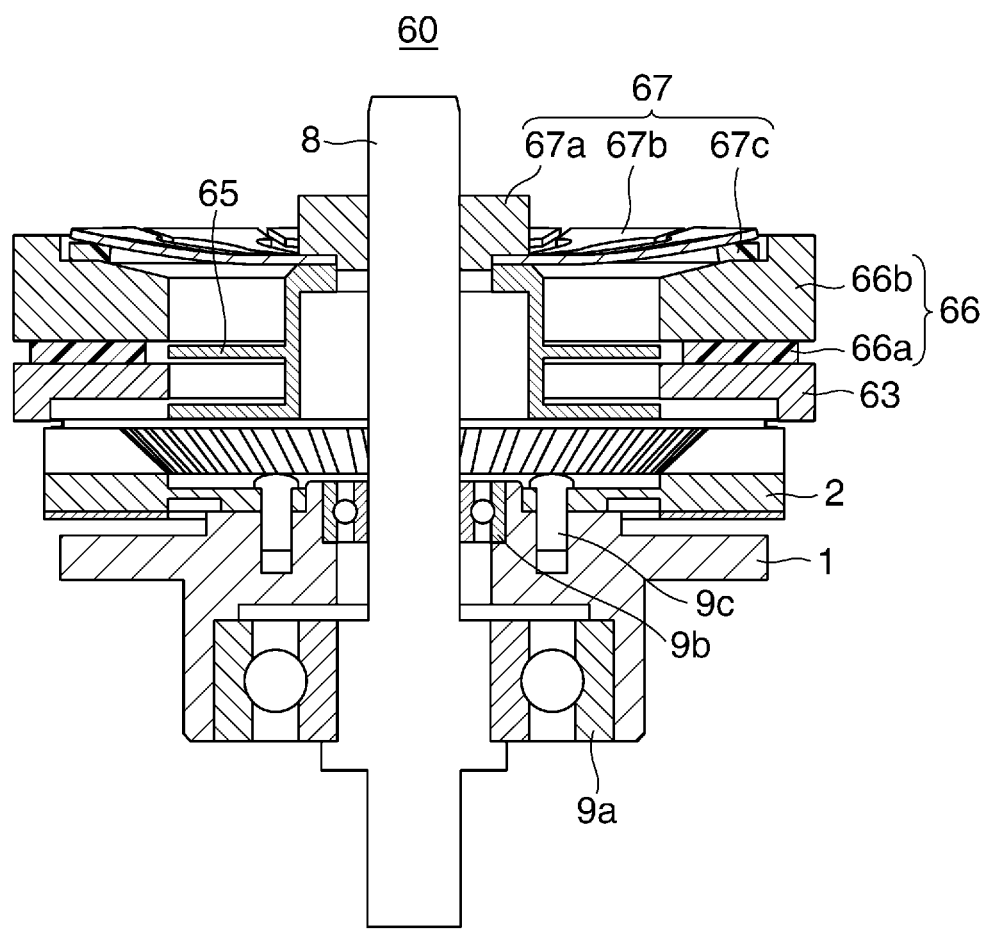
FIG. 11 is a cross-sectional view schematically showing an arrangement of a vibration-type drive apparatus according to a fifth embodiment of the present invention.

FIG. 11 is a cross-sectional view schematically showing an arrangement of a vibration-type drive apparatus 60 according to a fifth embodiment of the present invention. Component elements of the vibration-type drive apparatus 60 which are the same as the component elements of the vibration-type drive apparatus 10 according to the first embodiment described above are designated by the same reference numerals, and description thereof is omitted.

The vibration-type drive apparatus 60 has a driven body 63, a positioning member 65, a spring receiving member 66, and a pressurizing member 67. As compared to the driven body 3 according to the first embodiment described above, the driven body 63 differs from the driven body 3 only in the shape of a main body 63a (see FIG. 12A and FIG. 12B) and has the same portions as the supporting portion 3b and the contacting portion 3c (no reference numerals are shown in FIG. 11), which are provided in the driven body 3. The spring receiving member 66 has a damping rubber 66a and a weight member 66b. The pressurizing member 67 has a spring holding member 67a, a pressurizing spring 67b, and a spring receiving rubber 67c. The damping rubber 66a, the weight member 66b, and the spring receiving rubber 67c obtain the same effects as those obtained in the third and fourth embodiments.

Figure 12A:
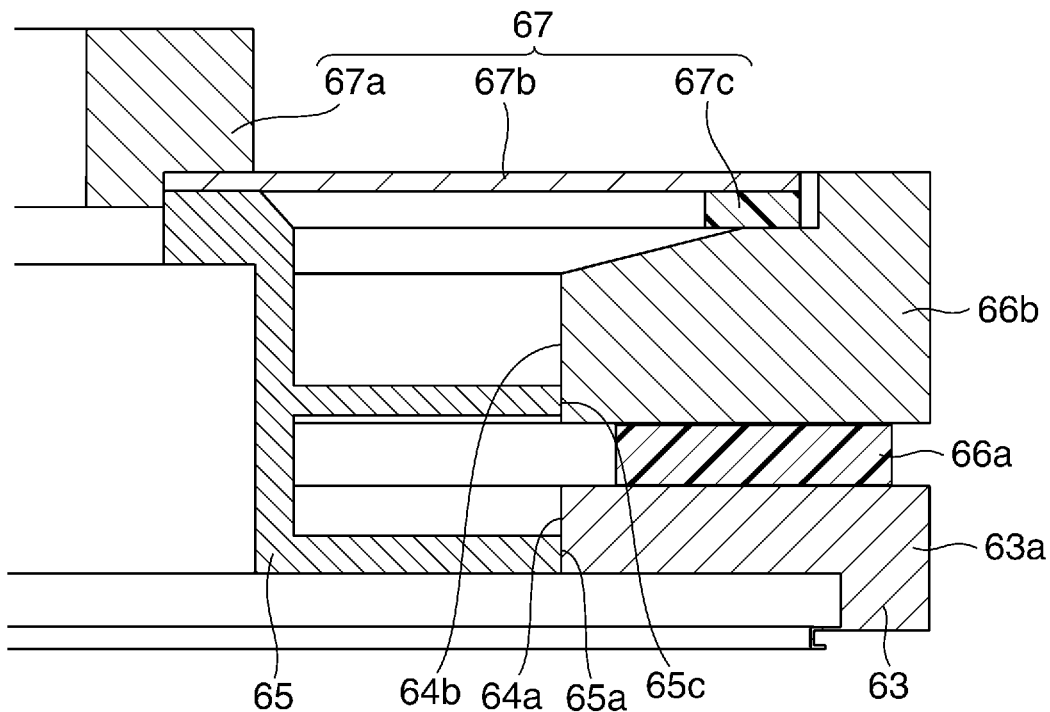
FIG. 12A and FIG. 12B are cross-sectional views partially showing states before and after the driven body is pressurized against the vibrating body during assembly of the vibration-type drive apparatus in FIG. 11.
Figure 12B:
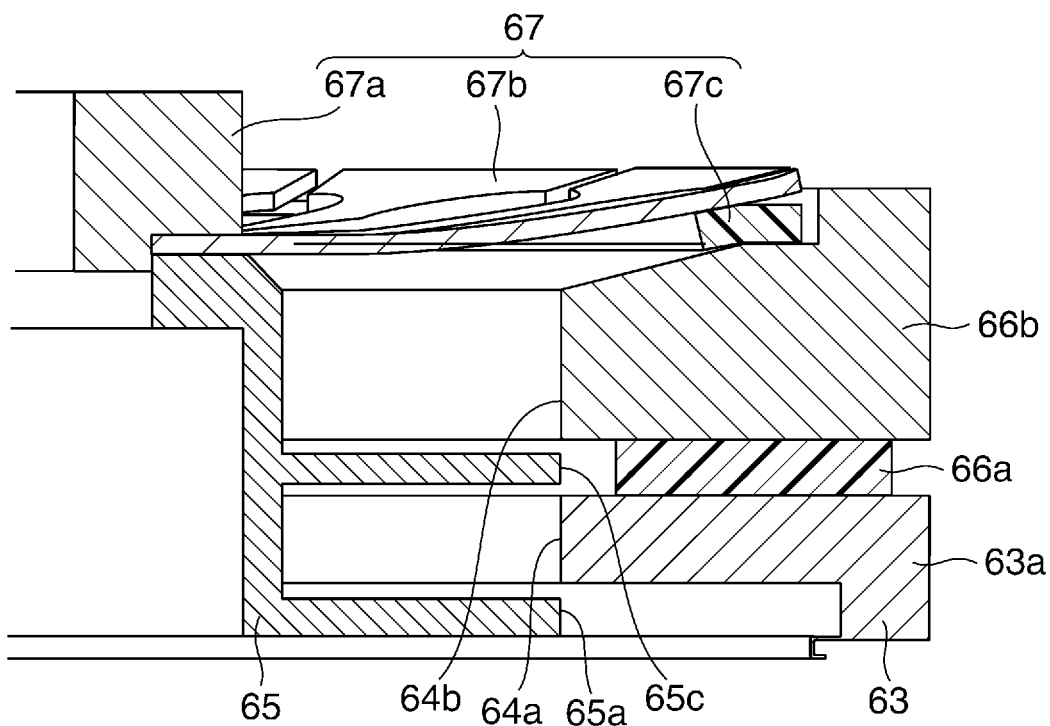

FIG. 12A is a cross-sectional view partially showing a state before the driven body 63 is pressurized against the vibrating body 2 by the pressurizing member 67 during assembly of the vibration-type drive apparatus 60. FIG. 12B is a cross-sectional view partially showing a state after the driven body 63 is pressurized against the vibrating body 2 by the pressurizing member 67 during assembly of the vibration-type drive apparatus 60.

An inner peripheral portion of the pressurizing spring 67b is sandwiched between the spring holding member 67a, which is fitted and fixed to the output shaft 8, and the positioning member 65, and the pressurizing spring 67b transmits rotary driving force of the driven body 63 to the output shaft 8. A first positioning portion 65a and a second positioning portion 65c are provided at an end of the positioning member 65 on an outer peripheral side. On an inner peripheral side of the driven body 63, a first fitting-receiving portion 64a to which the first positioning portion 65a of the positioning member 65 is to be fitted is provided. In the present embodiment, a tolerance of the first positioning portion 65a is g6, and a tolerance of the first fitting-receiving portion 64a is H7 so that the first positioning portion 65a and the first fitting-receiving portion 64a can have a relationship of a clearance fit. On an inner peripheral side of the weight member 66b, a second fitting-receiving portion 64b to which the second positioning portion 65c of the positioning member 65 is to be fitted is provided. In the present embodiment, a tolerance of the second positioning portion 65c is g6, and a tolerance of the second fitting-receiving portion 64b is H7 so that the second positioning portion 65c and the second fitting-receiving portion 64b can have a relationship of a clearance fit as with the relationship between the first positioning portion 65a and the first fitting-receiving portion 64a.

To assemble the vibration-type drive apparatus 60, first, the driven body 63, the damping rubber 66a, and the weight member 66b are stacked in this order on a sliding surface (upper surface) of the vibrating body 2 which slides in contact with the driven body 63. Next, the spring receiving rubber 67c and the spring holding member 67a, to which the pressurizing spring 67b is attached, are stacked on an upper surface of the weight member 66b while being fitted to the output shaft 8. This causes the first positioning portion 65a of the positioning member 65 to fit to the first fitting-receiving portion 64a of the driven body 63, and hence misalignment of a central axis of the driven body 63 and a central axis of the output shaft 8 in a radial direction is kept within an acceptable range. Also, the second positioning portion 65c of the positioning member 65 is fitted to the second fitting-receiving portion 64b of the weight member 66b, and hence misalignment of a central axis of the weight member 66b and the central axis of the output shaft 8 in the radial direction is kept within an acceptable range. Thus, in the state before the driven body 63 is pressurized against the vibrating body 2 by the pressurizing member 67, misalignment of the central axis of the driven body 63 with respect to a central axis of the vibrating body 2 in the radial direction is kept within an acceptable range.

The pressurizing spring 67b in the state shown in FIG. 12A is elastically deformed to apply pressure from the driven body 63 to the vibrating body 2 via the spring receiving rubber 67c and the spring receiving member 66. As the pressurizing spring 67b is elastically deformed, the spring holding member 67a and the positioning member 65 integrally move toward the vibrating body 2. As pressure is further increased until a required predetermined pressure is reached, the fit between the first positioning portion 65a of the positioning member 65 and the first fitting-receiving portion 64a of the driven body 63 is released, and the driven body 63 and the first positioning member 65 are brought out of contact with each other as shown in FIG. 12B. Likewise, the fit between the second positioning portion 65c of the positioning member 65 and the second fitting-receiving portion 64b of the weight member 66b is released, and the weight member 66b and the positioning member 65 are brought out of contact with each other.

It should be noted that the amount of deflection of the pressurizing spring 67b is greater than the length of the first fitting-receiving portion 64a and the length of the second fitting-receiving portion 64b in a pressurizing direction of the pressurizing spring 67b (a thrusting direction of the output shaft 8). Here, the "length of the first fitting-receiving portion 64a" means the length of a part of the first fitting-receiving portion 64a to which the first positioning portion 65a is fitted in the pressurizing direction of the pressurizing spring 67b. Likewise, the "length of the second fitting-receiving portion 64b" means the length of a part of the second fitting-receiving portion 64b to which the second positioning portion 65c is fitted in the pressurizing direction of the pressurizing spring 67b. Here, the length of the first fitting-receiving portion 64a and the length of the second fitting-receiving portion 64b are the same as the thickness of the first positioning portion 65a and the thickness of the second positioning portion 65c in the thrusting direction of the output shaft 8, respectively. When this condition is satisfied, the driven body 63 and the weight member 66b are brought out of contact with the positioning member 65.

In the vibration-type drive apparatus 60, a pressure from the pressurizing spring 67b generates a frictional force between the driven body 63 and the damping rubber 66a and between the weight member 66b and the spring receiving rubber 67c. As a result, even when both the fit between the first positioning portion 65a and the first fitting-receiving portion 64a and the fit between the second positioning portion 65c and the second fitting-receiving portion 64b are released, the driven body 63 is held by the frictional force so as not to be displaced in the radial direction. Thus, a predetermined pressure required for the vibration-type drive apparatus 60 is given while the position of the driven body 63, which was restricted before the pressurization by the pressurizing spring 67b, is maintained.

As described above, in the present embodiment, only by stacking necessary components (the driven body 63, the spring receiving member 66, and the pressurizing member 67) on the vibrating body 2, the vibration-type drive apparatus 60 is assembled while eccentricity of the driven body 63 is suppressed. Thus, the vibration-type drive apparatus 60 is assembled without using jigs, and this considerably increases productivity. Moreover, since the two positioning portions are brought into the non-contacting state when the vibration-type drive apparatus 60 is in use (running), undesired vibration of the vibration-type drive apparatus 60 is prevented from occurring. Moreover, since the driven body 63 and the weight member 66b are allowed to be positioned using one positioning member 65, eccentricity of the driven body 63 and the weight member 66b is suppressed with increased accuracy.

A description will now be given of an industrial robot according to a sixth embodiment which is an example of apparatuses (machines) having the vibration-type drive apparatuses 10, 30, 40, 50, and 60 (hereafter referred to as "the vibration-type drive apparatus 10 or the like") according to the embodiments described above.

Figure 13:
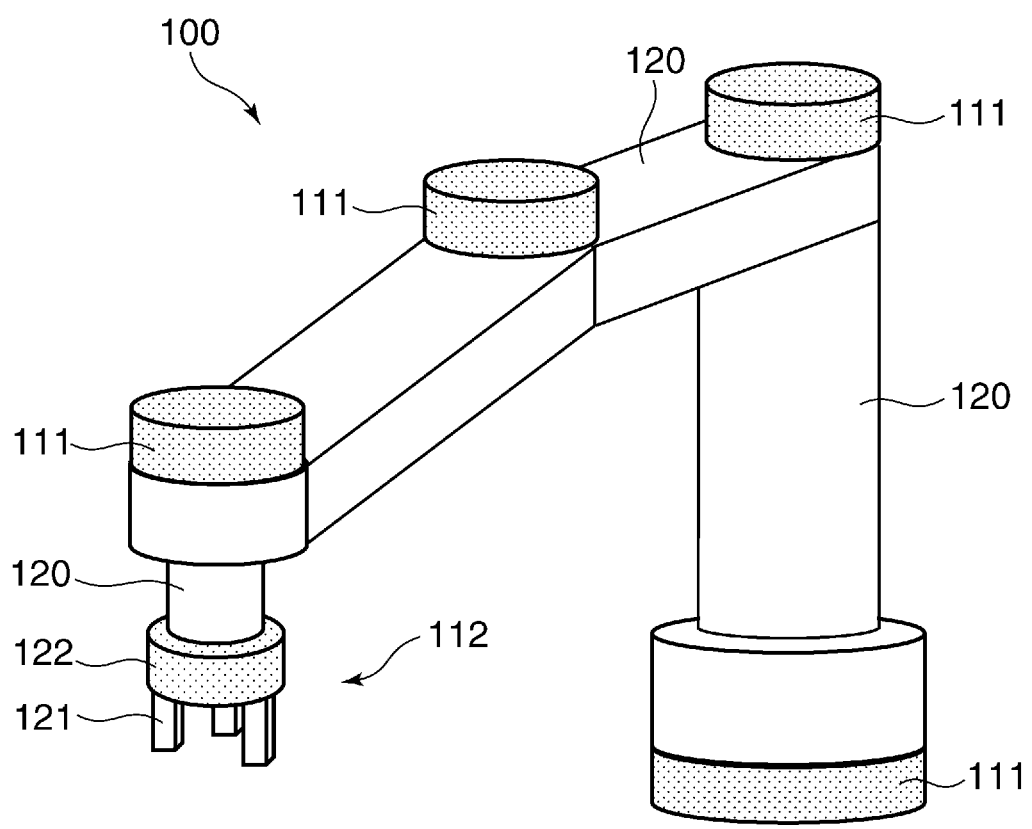
FIG. 13 is a perspective view schematically showing an arrangement of a robot equipped with any of vibration-type drive apparatuses according to the embodiments of the present invention.

FIG. 13 is a perspective view schematically showing an arrangement of a robot 100 equipped with a vibration-type drive apparatus, and here, a horizontal articulated robot which is a kind of industrial robot is illustrated. The vibration-type drive apparatus 10 or the like is incorporated in arm joint portions 111 and a hand portion 112. The arm joint portions 111 each connect two arms together such that that an angle at which the two arms 120 cross each other is changeable. The hand portion 112 has an arm 120, a holding portion 121, which is attached to an end of the arm 120, and a hand joint portion 122, which connects the arm 120 and the holding portion 121 together. The vibration-type drive apparatus 10 or the like is used for the arm joint portions 111 which change the angles formed by the arms 120 and the hand joint portion 122 which rotates the holding portion 121 to a predetermined angle.

Figure 14:
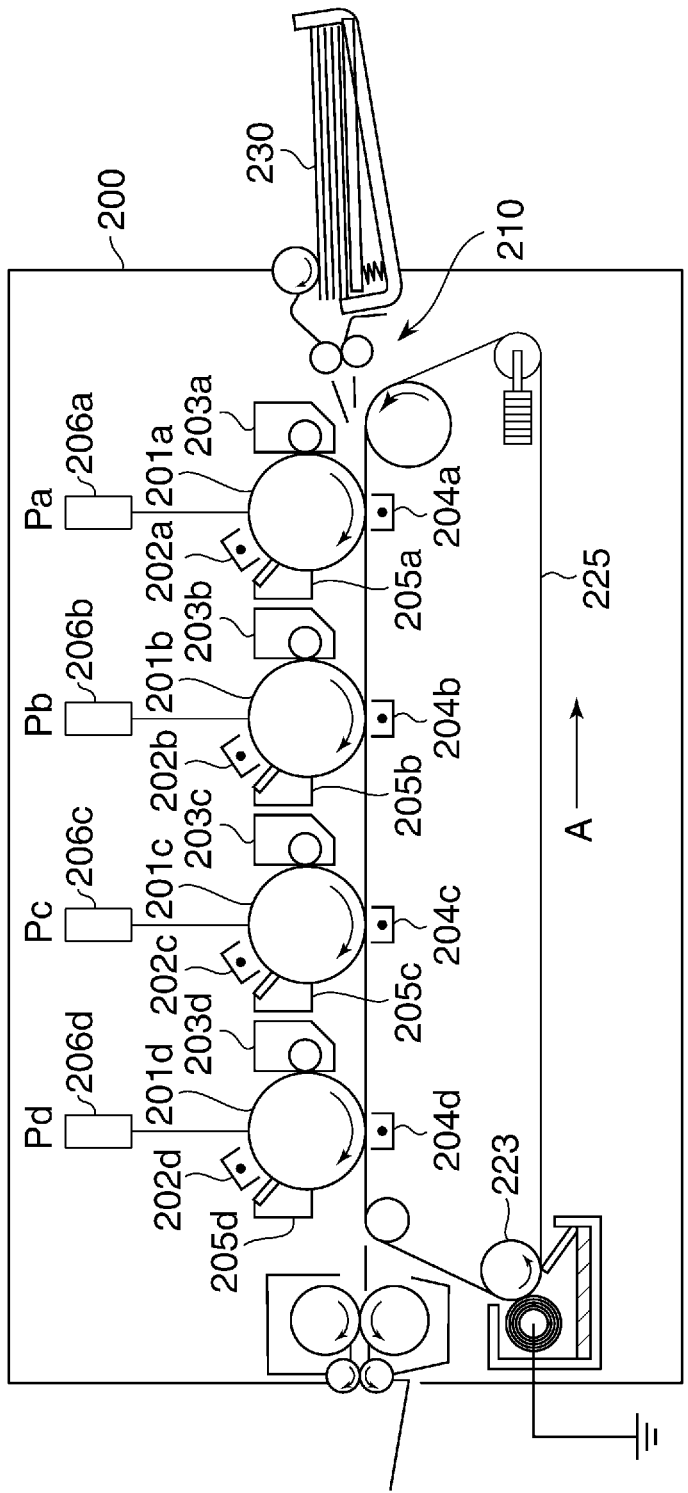
FIG. 14 is a cross-sectional view showing an internal arrangement of a color image forming apparatus equipped with any of vibration-type drive apparatuses according to the embodiments of the present invention.

A description will now be given of an image forming apparatus according to a seventh embodiment which is an example of apparatuses (machines) having the vibration-type drive apparatus 10 or the like according to the embodiments described above. FIG. 14 is a cross-sectional view showing an internal arrangement of a color image forming apparatus 200 having a vibration-type drive apparatus. The color image forming apparatus 200 has four image forming means Pa, Pb, Pc, and Pd, but the number of image forming means should not necessarily be four.

The four image forming means Pa, Pb, Pc, and Pd have substantially the same arrangement and have photosensitive drums 201a, 201b, 201c, and 201d, respectively, which are rotatively-driven image carriers. Chargers 202a, 202b, 202c, and 202d which uniformly charge the photosensitive drums 201a, 201b, 201c, and 201d are disposed around the respective photosensitive drums 201a to 201d. Developers 203a, 203b, 203c, and 203d, transfer chargers 204a, 204b, 204c, and 204d, and cleaning devices 205a, 205b, 205c, and 205d are disposed around the respective photosensitive drums 201a to 201d. The developers 203a to 203d develop electrostatic images, which are formed on respective surfaces of the photosensitive drums 201a to 201d, with toner. The transfer chargers 204a to 204d transfer developed toner images to a transfer material 230. The cleaning devices 205a to 205d remove toner remaining on the photosensitive drums 201a to 201d. Further, exposure devices 206a, 206b, 206c, and 206d are placed above the respective photosensitive drums 201a to 201d.

A conveying belt 225 which is placed in contact with the photosensitive drums 201a to 201d bears the transfer material 230 fed through a feeding means 210 and driven in a direction indicated by an arrow A in FIG. 14 by a driving roller 223. The conveying belt 225 and the driving roller 223 constitute a conveying means for conveying the transfer material 230 successively to the image forming means Pa to Pd. The vibration-type drive apparatus 10 or the like is used as a driving motor for rotating the photosensitive drums 201a to 201d and as a driving motor for rotating the driving roller 223 for driving the conveying belt 225.

Figure 15A:
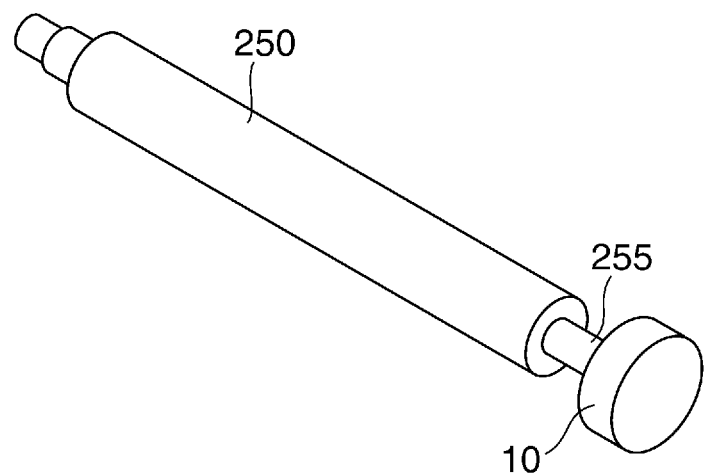
FIGS. 15A and 15B are perspective views schematically showing an arrangement of a vibration-type drive apparatus when the vibration-type drive apparatus is used as a photosensitive drum driving motor and as a conveying belt driving motor which constitutes the color image forming apparatus in FIG. 14.

FIG. 15A is a perspective view schematically showing an arrangement of the vibration-type drive apparatus 10 or the like provided as a photosensitive drum driving motor. For example, the vibration-type drive apparatus 10 or the like is allowed to be directly connected to a driving shaft 255 of a photosensitive drum 250 (corresponding to the photosensitive drums 201a to 201d). As a result, deceleration means such as gears which have conventionally been required are dispensed, which reduces color misregistration and improves printing quality.

Figure 15B:
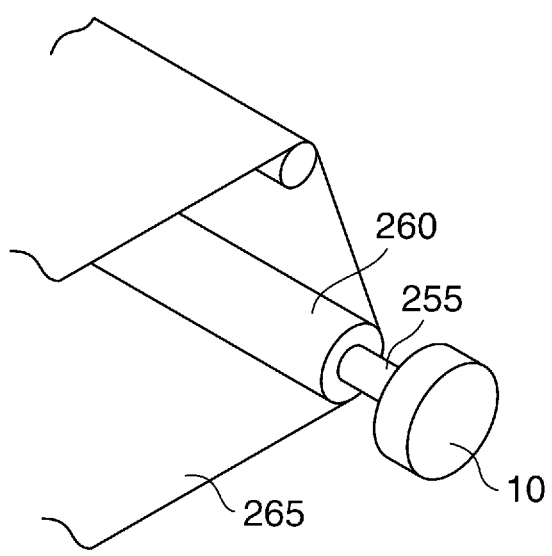

FIG. 15B is a perspective view schematically showing an arrangement of the vibration-type drive apparatus 10 or the like provided as a conveying belt driving motor. Referring to FIG. 15B, for example, the vibration-type drive apparatus 10 or the like is allowed to be directly connected to a driving shaft 255 of a driving roller 260 (corresponding to the driving roller 233) for a conveying belt 265 (corresponding to the conveying belt 225). Driving the conveying belt 265 in this manner obtains the same effects as those described above obtained when a photosensitive drum is driven by the vibration-type drive apparatus 10 or the like.

Figure 16:
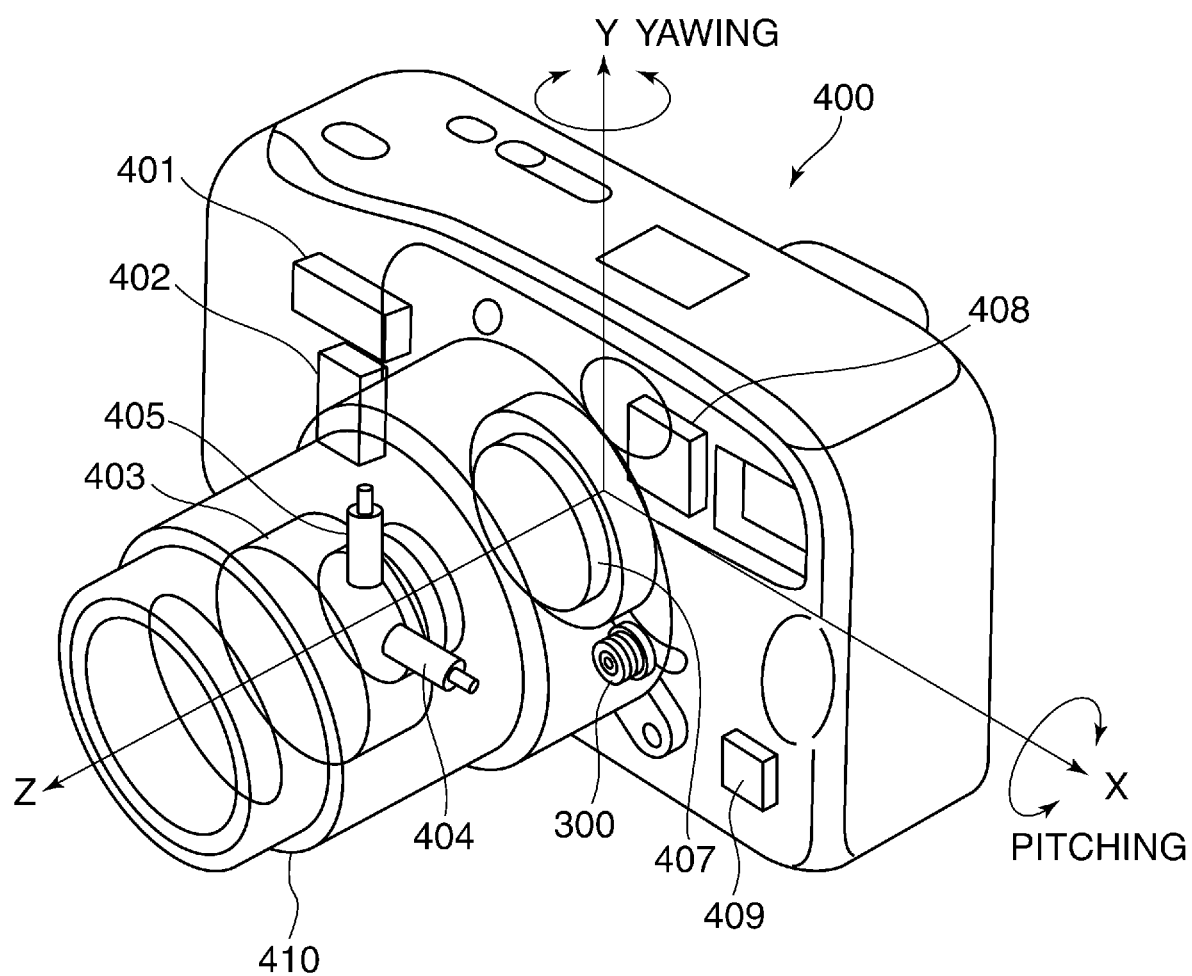
FIG. 16 is a cross-sectional view showing an internal arrangement of a digital camera which is an exemplary image pickup apparatus equipped with any of vibration-type drive apparatuses according to the embodiments of the present invention.
Figure 17:
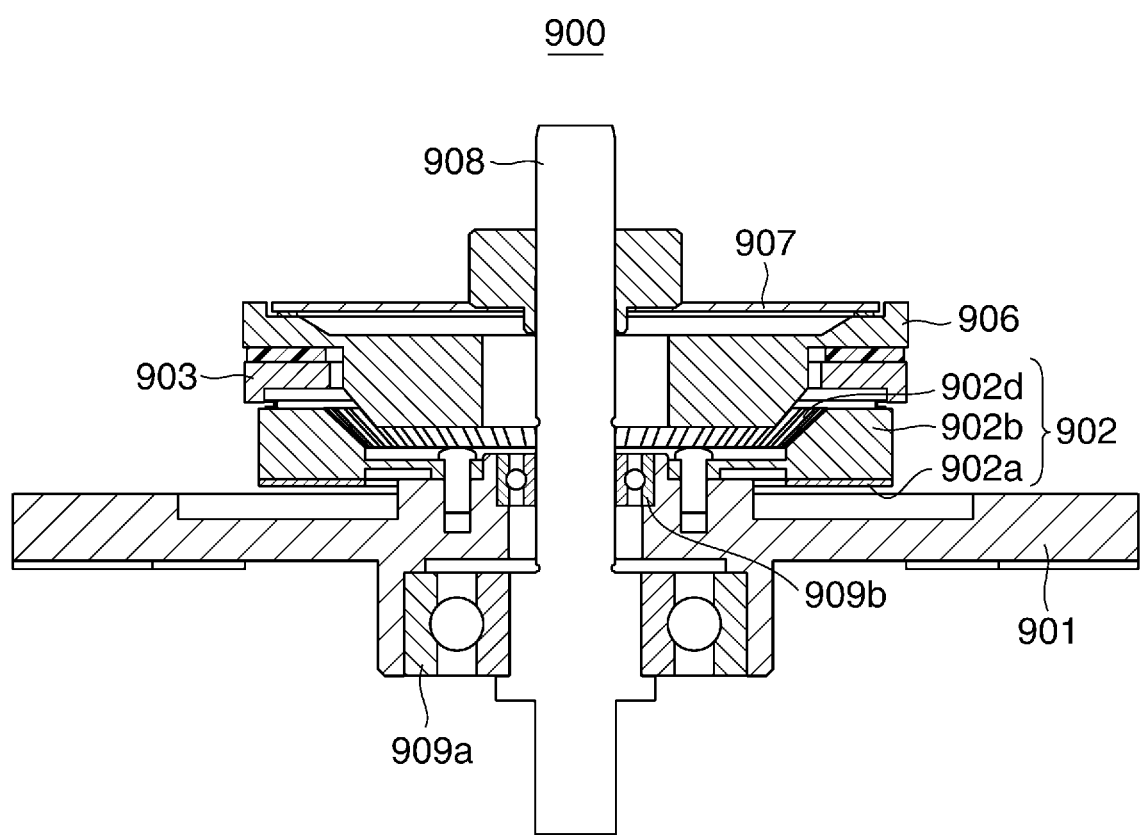
FIG. 17 is a cross-sectional view schematically showing an arrangement of a vibration-type drive apparatus according to prior art.

A description will now be given of an image pickup apparatus according to an eighth embodiment which is an example of apparatuses (machines) having the vibration-type drive apparatus 10 or the like according to the embodiments described above. FIG. 16 is a cross-sectional view showing an internal arrangement of a digital camera 400 which is an exemplary image pickup apparatus, and a part is transparently illustrated.

A lens barrel 410 is mounted on a front side of the digital camera 400, and a plurality of lenses (not shown) including a focus lens 407 and an image stabilization optical system 403 are placed in the lens barrel 410. The image stabilization optical system 403 is caused to vibrate in a vertical direction (Y direction) and a horizontal direction (X direction) through transmission of rotation of biaxial coreless motors 404 and 405.

A microcomputer (MPU) 409, which controls the overall operation of the digital camera 400, and an image pickup device 408 are disposed on a main body side of the digital camera 400. The image pickup device 408, which is a photoelectrical conversion device such as a CMOS sensor or a CCD sensor, converts an optical image formed by light which has passed through the lens barrel 410 into an analog electric signal. An analog electric signal output from the image pickup device 408 is converted into a digital signal by an A/D converter, not shown, then subjected to predetermined image processing by an image processing circuit, not shown, and stored as image data (picture data) in a storage medium such as a semiconductor memory, not shown.

On the main body side of the digital camera 400, a gyro sensor 401, which detects the amount of camera shake (vibration) in a vertical direction (pitching), and a gyro sensor 402, which detects the amount of camera shake (vibration) in a horizontal direction (yawing), are provided as internal devices. The coreless motors 404 and 405 are driven in directions opposite to directions of vibrations detected by the gyro sensors 401 and 402 to vibrate an optical axis of the image stabilization optical system 403. As a result, the vibration of the optical axis caused by camera shake is canceled out, and hence a photograph with its image stabilized is taken.

The vibration-type drive apparatus 10 or the like is used as a driving unit 300 which drives the focus lens 407, which is placed in the lens barrel 410, in a direction of the optical axis through a gear train, not shown. This, however, is not limitative, but the vibration-type drive apparatus 10 or the like may be used to drive an arbitrary lens such as a zoom lens, not shown.

In the first embodiment, a tolerance of the positioning member 5a is g6, and a tolerance of the fitting-receiving portion 4 is H7 so that a pair of the positioning portion 5a and the fitting-receiving portion 4 can have a relationship of a clearance fit, and the same holds for the third embodiment as well. This, however, is not limitative, but the positioning portion 5a and the fitting-receiving portion 4 may be fitted together with appropriate tolerances selected with consideration given to the sizes of the positioning member 5a and the fitting-receiving portion 4, required shape accuracy, production cost, and so forth.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST

2 Vibrating body
2a Piezoelectric element
2b Elastic body
3 Driven body
4, 34 Fitting-receiving portion
5a Positioning portion
6, 47c, 57c, 67c Spring receiving rubber
7 Pressurizing member
8 Output shaft
10, 30, 40, 50, 60 Vibration-type drive apparatus
46, 56, 66 Spring receiving member
46a, 56a, 66a Damping rubber
46b, 56b, 66b Weight member
100 Robot
200 Color image forming apparatus
300 Drive unit
400 Digital camera

The invention claimed is:

1. A vibration-type drive apparatus comprising:
a vibrating body configured to have an elastic body and an electro-mechanical energy conversion element mounted on said elastic body;
a driven body configured to be brought into contact with said vibrating body; and
a pressure member configured to bring said driven body into contact with said vibrating body,
wherein relative positions of said vibrating body and said driven body change due to vibrations excited in said vibrating body, and
wherein said pressure member comprises a positioning portion, said driven body comprises a fitting-receiving portion configured to be able to fit with the positioning portion, the positioning portion fits with the fitting-receiving portion before the pressure member applies pressure to the driven body, and the positioning portion does not fit with the fitting-receiving portion while the pressure member applies pressure to the driven body.

2. The vibration-type drive apparatus according to claim 1, wherein the positioning portion and the fitting-receiving portion are configured to be brought into abutment with each other by releasing pressure generated by said pressure member.

3. The vibration-type drive apparatus according to claim 1, wherein the positioning portion is configured to be moved in a direction away from the fitting-receiving portion through pressure applied by said pressure member.

4. The vibration-type drive apparatus according to claim 3, wherein the direction in which the positioning portion moves away from the fitting-receiving portion is a pressure applying direction of said pressure member.

5. The vibration-type drive apparatus according to claim 3, wherein the direction in which the positioning portion moves away from the fitting-receiving portion is a direction that crosses a pressure applying direction of said pressure member.

6. The vibration-type drive apparatus according to claim 1, wherein the positioning portion comes into direct contact with said pressure member and said driven body.

7. The vibration-type drive apparatus according to claim 1, wherein in a pressure applying direction of said pressure member, an amount of deflection from a pivot point of deflection of said pressure member to an end of the positioning portion is longer than a length of a part of the fitting-receiving portion which fits with the positioning portion.

8. The vibration-type drive apparatus according to claim 1, wherein said pressure member is a plate spring having an annular shape, and
a direction perpendicular to a radial direction of the plate spring is a pressure applying direction of said pressure member.

9. The vibration-type drive apparatus according to claim 8, wherein the positioning portion is an outer peripheral end face of the plate spring, and
the fitting-receiving portion is a wall that is provided in said driven body, fitted onto the outer peripheral end face of the plate spring with a predetermined tolerance, and parallel to the pressure applying direction.

10. The vibration-type drive apparatus according to claim 9, wherein a recess portion is formed in a corner portion of an outer peripheral end of the plate spring.

11. The vibration-type drive apparatus according to claim 8, further comprising a plurality of pairs of the positioning portion and the fitting-receiving portion.

12. The vibration-type drive apparatus according to claim 8, further comprising:
a fixing member configured to fix said driven body;
an output shaft configured to be pivotally supported by the fixing member;
a holding member configured to be mounted on the output shaft and hold the plate spring; and
a spring receiving rubber configured to be interposed between the plate spring and said driven body and be urged against said driven body through pressure from the plate spring,
wherein said driven body is rotated by vibrations excited in said vibrating body, and the output shaft is rotated by transmitting rotary driving force of said driven body to the output shaft via the spring receiving rubber, the plate spring, and the holding member.

13. The vibration-type drive apparatus according to claim 8, wherein the fitting-receiving portion is a wall provided in said driven body and parallel to the pressure applying direction, and
the vibration-type drive apparatus further comprises a positioning member configured to have the positioning portion that holds the plate spring and is fitted onto the fitting-receiving portion with a predetermined tolerance.

14. The vibration-type drive apparatus according to claim 13, further comprising a plurality of the positioning portion and the fitting-receiving portion.

15. The vibration-type drive apparatus according to claim 14, further comprising an outer peripheral end face of the plate spring as another positioning portion,
wherein said driven body further comprises, as another fitting-receiving portion, a wall that is parallel to the pressure applying direction and fitted onto the outer peripheral end face of the plate spring with a predetermined tolerance.

16. The vibration-type drive apparatus according to claim 8, further comprising:
a damping rubber configured to be urged against said driven body; and
a weight member configured to urge said damping rubber against said driven body in response to pressure from the plate spring,
wherein the positioning portion is an outer peripheral end face of the plate spring, and
the fitting-receiving portion is a wall provided in said weight member, fitted onto the outer peripheral end face of the plate spring with a predetermined tolerance, and parallel to the pressure applying direction.

17. The vibration-type drive apparatus according to claim 14, further comprising:
an outer peripheral end face of the plate spring as another positioning portion,
a damping rubber configured to be urged against said driven body; and
a weight member configured to urge said damping rubber against said driven body in response to pressure from the plate spring,
wherein said weight member further comprises, as another fitting-receiving portion, a wall that is parallel to the pressure applying direction and fitted onto the outer peripheral end face of the plate spring with a predetermined tolerance.

18. The vibration-type drive apparatus according to claim 16, further comprising a plurality of the positioning portion and the fitting-receiving portion.

19. The vibration-type drive apparatus according to claim 18, wherein
as another positioning member, a wall that is parallel to the pressure applying direction is provided in the weight member, and
as another fitting-receiving portion, a wall that is parallel to the pressure applying direction and is fitted onto the other positioning portion with a predetermined tolerance is provided in said driven body.

20. The vibration-type drive apparatus according to claim 16, further comprising:
a fixing member configured to fix said driven body;
an output shaft configured to be pivotally supported by the fixing member;
a holding member configured to be mounted on the output shaft and hold the plate spring by sandwiching with the positioning member; and
a spring receiving rubber configured to be interposed between the plate spring and said weight member and urged against said weight member by pressure from the plate spring,
wherein said driven body is rotated by vibrations excited in said vibrating body, and the output shaft is rotated by transmitting rotary driving force of said driven body to the output shaft via the damping rubber, the weight member, the spring receiving rubber, the plate spring, and the holding member.

21. The vibration-type drive apparatus according to claim 8, wherein the positioning portion and the fitting-receiving portion are fitted together when the vibration-type drive apparatus is brought into a state in which the plate spring applies no pressure to said driven body, and the fit between the positioning portion and the fitting-receiving portion is released when the vibration-type drive apparatus is brought into a state in which the plate spring applies a predetermined pressure to said driven body.

22. A vibration-type drive apparatus comprising:
a vibrating body configured to have an elastic body and an electro-mechanical energy conversion element mounted on said elastic body;
a driven body configured to be brought into contact with said vibrating body;
a positioning portion configured to come into contact with said driven body; and
a pressure member configured to bring said driven body into contact with said vibrating body,
wherein relative positions of said vibrating body and said driven body change due to vibrations excited in said vibrating body, and
wherein said driven body comprises a fitting-receiving portion configured to be able to fit with the positioning portion, the positioning portion fits with the fitting-receiving portion before assembling the vibration-type drive apparatus, and the positioning portion does not fit with the fitting-receiving portion after completion of assembling the vibration-type drive apparatus.

* * * * *